United States Patent
Yannone

(10) Patent No.: US 9,341,705 B2
(45) Date of Patent: May 17, 2016

(54) PASSIVE RANGING OF A TARGET

(71) Applicant: BAE Systems Information and Electronic Systems Integration Inc., Nashua, NH (US)

(72) Inventor: Ronald M. Yannone, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 496 days.

(21) Appl. No.: 13/760,660

(22) Filed: Feb. 6, 2013

(65) Prior Publication Data

US 2015/0268329 A1 Sep. 24, 2015

Related U.S. Application Data

(63) Continuation-in-part of application No. 12/751,875, filed on Mar. 31, 2010, now Pat. No. 8,436,762, which is a continuation-in-part of application No. 12/498,310, filed on Jul. 6, 2009, now Pat. No.
(Continued)

(51) Int. Cl.
*G01S 13/42* (2006.01)
*G01S 7/292* (2006.01)
(Continued)

(52) U.S. Cl.
CPC ............... *G01S 7/292* (2013.01); *G01S 5/0252* (2013.01); *G01S 5/0278* (2013.01); *G01S 5/0294* (2013.01); *G01S 7/295* (2013.01); *G01S 11/02* (2013.01); *G01S 19/42* (2013.01)

(58) Field of Classification Search
CPC .......... G01S 11/04; G01S 5/0294; G01S 5/04

USPC ........... 342/13, 126, 133, 139, 140, 146, 147, 342/417, 463
See application file for complete search history.

(56) References Cited

U.S. PATENT DOCUMENTS

| 3,895,382 A | 7/1975 | Litchford |
| 4,293,857 A | 10/1981 | Baldwin |

(Continued)

FOREIGN PATENT DOCUMENTS

| WO | 2006135416 | 12/2006 |
| WO | 2007065879 | 6/2007 |
| WO | 2008051204 | 5/2008 |

OTHER PUBLICATIONS

A Munir, "Maneuvering target tracking using an adaptive interacting multiple model algorithm", Jul. 1, 1994, IEEE American Control Conference, vol. 2, pp. 1324-1328.*
(Continued)

*Primary Examiner* — Timothy A Brainard
(74) *Attorney, Agent, or Firm* — Bryan A. Santarelli; David A. Rardin

(57) ABSTRACT

In an embodiment, an apparatus includes a detector and a range finder. The detector is configured to determine a direction to a target in response to a signal received from the target, and the range finder is configured to determine a range to the target in response to the direction and independently of an amplitude of the signal. For example, such an apparatus (e.g., a computer-based apparatus) may be disposed on tactical fighter aircraft, and may be able to range (e.g., azimuth range or slant range) a target passively even if an accurate measure of the amplitude of the signal received from the target is unavailable.

17 Claims, 11 Drawing Sheets

Related U.S. Application Data 8,164,510, and a continuation-in-part of application No. 12/364,480, filed on Feb. 2, 2009, now Pat. No. 8,081,106.

(60) Provisional application No. 61/063,251, filed on Jan. 31, 2008, provisional application No. 61/063,290, filed on Jan. 31, 2008, provisional application No. 61/063,271, filed on Jan. 31, 2008, provisional application No. 61/063,207, filed on Jan. 31, 2008.

(51) Int. Cl.
*G01S 11/02* (2010.01)
*G01S 5/02* (2010.01)
*G01S 7/295* (2006.01)
*G01S 19/42* (2010.01)

(56) References Cited

U.S. PATENT DOCUMENTS

| | | | |
|---|---|---|---|
| 4,370,656 A | 1/1983 | Frazier et al. | |
| 4,668,954 A | 5/1987 | Tomasi | |
| 4,845,502 A | 7/1989 | Carr et al. | |
| 5,059,967 A | 10/1991 | Roos | |
| 5,189,429 A | 2/1993 | Guard | |
| 5,198,822 A | 3/1993 | Brown | |
| 5,237,333 A | 8/1993 | Guard | |
| 5,247,307 A | 9/1993 | Gandar et al. | |
| 5,457,466 A | 10/1995 | Rose | |
| 5,479,360 A | 12/1995 | Seif et al. | |
| 5,557,282 A | 9/1996 | Mertens | |
| 5,566,074 A | 10/1996 | Hammer | |
| 5,977,906 A | 11/1999 | Ameen et al. | |
| 6,046,695 A | 4/2000 | Poehler et al. | |
| 6,150,979 A | 11/2000 | Tsui | |
| 6,292,136 B1 | 9/2001 | Egnell | |
| 6,564,149 B2 | 5/2003 | Lai | |
| 6,614,012 B2 | 9/2003 | Schneider et al. | |
| 6,674,434 B1 | 1/2004 | Chojnacki et al. | |
| 6,690,317 B2 | 2/2004 | Szeto et al. | |
| 6,809,679 B2 | 10/2004 | LaFrey et al. | |
| 6,963,291 B2 | 11/2005 | Holforty et al. | |
| 7,002,510 B1* | 2/2006 | Choate | G01S 11/04 342/118 |
| 7,132,961 B2 | 11/2006 | Yannone et al. | |
| 7,358,891 B2 | 4/2008 | Struckman et al. | |
| 7,418,343 B1 | 8/2008 | McGraw et al. | |
| 7,453,400 B2 | 11/2008 | Struckman et al. | |
| 7,579,989 B2 | 8/2009 | Winterling et al. | |
| 7,764,217 B2 | 7/2010 | Yannone | |
| 7,978,049 B2 | 7/2011 | Leitch | |
| 8,054,216 B2 | 11/2011 | Kinoshita et al. | |
| 8,081,106 B2 | 12/2011 | Yannone | |
| 8,102,309 B2 | 1/2012 | Nakagawa | |
| 8,159,387 B1 | 4/2012 | Fernandez et al. | |
| 8,164,510 B2 | 4/2012 | Yannone | |
| 2004/0006424 A1* | 1/2004 | Joyce et al. | 701/207 |
| 2004/0178943 A1 | 9/2004 | Niv | |
| 2005/0110661 A1 | 5/2005 | Yannone | |
| 2006/0067857 A1* | 3/2006 | Samolyk | 422/44 |
| 2009/0231181 A1 | 9/2009 | Yannone | |
| 2009/0310664 A1 | 12/2009 | Yannone | |
| 2010/0156697 A1 | 6/2010 | Yannone | |
| 2010/0207762 A1 | 8/2010 | Lee et al. | |
| 2011/0187582 A1 | 8/2011 | Tsunekawa | |
| 2011/0227783 A1 | 9/2011 | Yannone | |
| 2012/0051598 A1 | 3/2012 | Ikeda | |
| 2012/0212366 A1* | 8/2012 | Alalusi | 342/118 |
| 2012/0227783 A1 | 9/2012 | Funk | |

OTHER PUBLICATIONS

Ross L. Finney, Maurice D. Weir & Frank R. Giordano, "Lines and Planes in Space", "Thomas' CALCULUS", 10th edition, 2003, pp. 807-808, Addison Wesley, Boston, USA.

Gregoire, D.G.; Singletary, G.B., "Advanced ESM AOA and location techniques", Aerospace and Electronics Conference, 1989, NAECON 1989., Proceedings of the IEEE 1989 National, vol., No., pp. 917-924, vol. 2, May 22-26, 1989.

IP.com Prior Art Database Disclosure (Source: IPCOM) Disclosure No. IPCOM000073013D dated Oct. 1, 1970 added to Prior Art Database on Feb. 22, 2005 Disclosed by: IBM (TDB 10-70 pp. 1342-1344) Raabe, HP—Author Disclosure File: 3 pages.

* cited by examiner

PASSIVE RANGING OF A TARGET

CLAIM OF PRIORITY

The present application is a Continuation in Part of U.S. patent application Ser. No. 12/751,875, filed Mar. 31, 2010, which application is a Continuation In Part of U.S. patent application Ser. No. 12/498,310, filed Jul. 6, 2009, now U.S. Pat. No. 8,164,510, issued Apr. 24, 2012, and of U.S. patent application Ser. No. 12/364,480, filed Feb. 2, 2009, now U.S. Pat. No. 8,081,106, issued Dec. 20, 2011, which application claims priority to U.S. Provisional Application Ser. Nos. 61/063,251, 61/063,290, 61/063,271 and 61/063,207, filed on Jan. 31, 2008. All of the foregoing applications are incorporated herein by reference in their entireties.

STATEMENT OF GOVERNMENT INTEREST

The invention was made with United States Government support under Contract No. N00019-02-C-3002. Accordingly, the United States Government has certain rights in this invention.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

In an embodiment, an apparatus includes a detector and a range finder that is configured to implement a range-finder algorithm. The detector is configured to determine a direction to a target in response to a signal received from the target, and the range finder is configured to determine a range to the target in response to the direction and independently of an amplitude of the signal.

For example, such an apparatus (e.g., a computer-based apparatus) may be disposed on tactical fighter aircraft, and may be able to range (e.g., "horizontal" (azimuth) range or slant range) a target passively even if an accurate measure of the amplitude of the signal received from the target is unavailable.

DETAILED DESCRIPTION

An operator of a moving vehicle may wish to know a range to a moving target, but without giving away the location of the vehicle to the operator of the target.

For example, a pilot of a tactical fighter aircraft (hereinafter "aircraft") may wish to know the range to an "unfriendly" aircraft (hereinafter "target aircraft") without making his/her presence known to the pilot of the target aircraft so as not to lose the element of surprise.

Furthermore, the pilot of the aircraft may want to know the range to the target aircraft within a time window that affords him/her the opportunity to take appropriate action regarding the target. For example, assuming that he/she has sufficient time to do so, the pilot of the aircraft may respond to the target aircraft in one of the following ways: evade the target aircraft, fire a missile at the target aircraft, or engage the target aircraft.

Unfortunately, conventional techniques for passively ranging a target aircraft from a tactical aircraft may be unable to provide a sufficiently accurate estimate of the range to the target aircraft within a time window that is short enough to allow the pilot of the tactical aircraft to take appropriate action. "Passive ranging" means that the tactical aircraft ranges the target aircraft not by emitting any signals, but by analyzing signals (hereinafter "passive signals") emanating from the target aircraft along with the measurements of the angles at which these passive signals are incident to the tactical aircraft (e.g., at least "azimuth" and "elevation" angles can be used for correlating multiple sets of signals from different target aircraft in the battle space). Examples of such signals that may emanate from a target aircraft include radar signals (either emitted or reflected by the target aircraft), and infrared signals caused by the target aircraft's jet trail or by the heating of the target aircraft's fuselage due to friction with the surrounding air.

For example, one such technique relies upon analyzing the amplitudes and incident angles of passive signals emanating from a target aircraft.

But unfortunately, this technique may be unable to provide a sufficiently accurate range estimate within a sufficiently short time window due to the degradation of the passive-signal amplitude caused by, e.g., noise and atmosphere-induced fading.

However, an embodiment of a technique that is suitable for providing a sufficiently accurate estimate of the range from an aircraft to a target aircraft within a sufficiently short time window is described below in conjunction with FIGS. 4-9; for example, this technique may be independent of the amplitudes of the passive signals emanating from the target aircraft, and may rely only on the incident angles of the passive signals.

Figure 1:
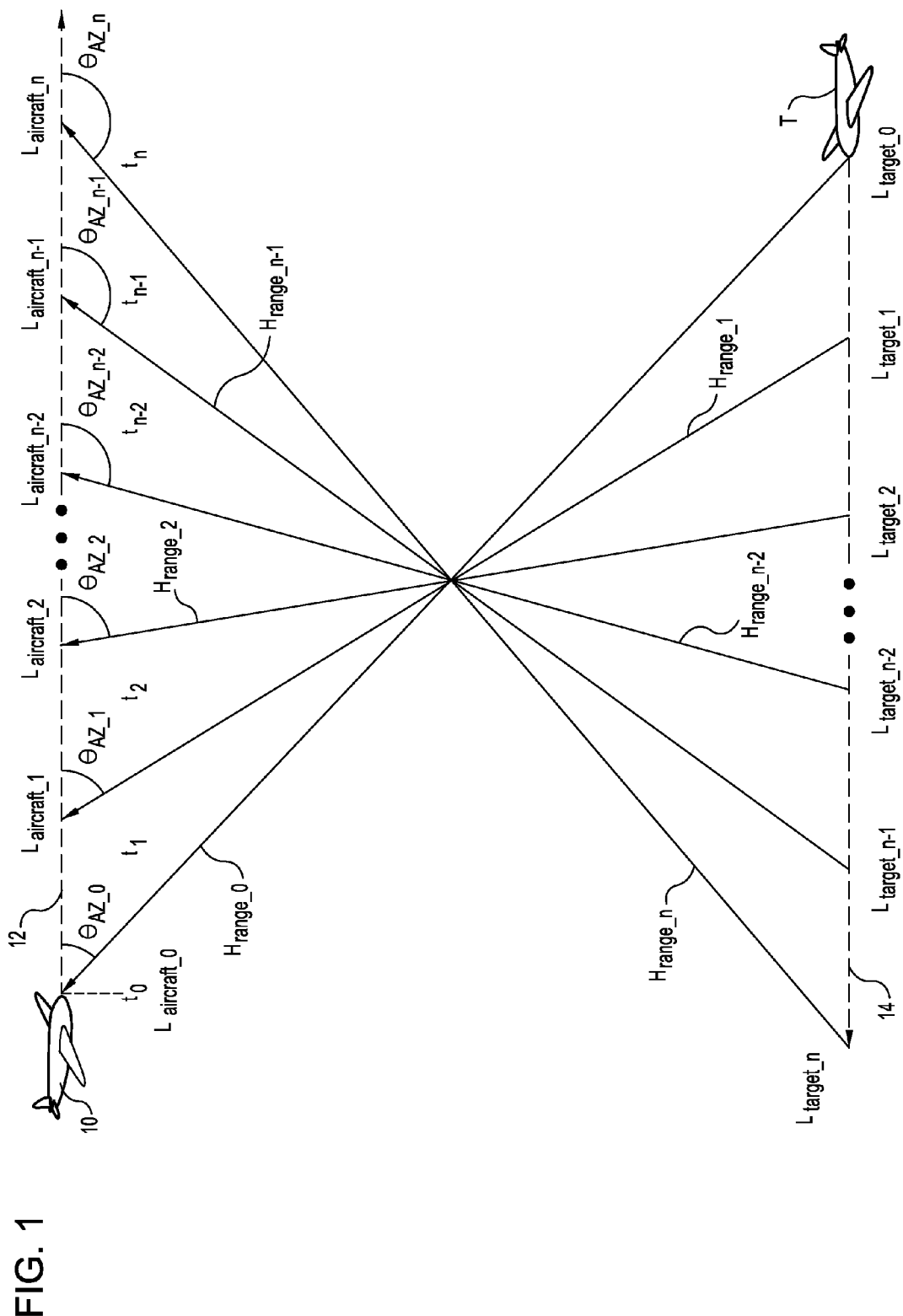
FIG. 1 is an overhead view of a tactical fighter aircraft and a target aircraft having opposite headings.
Figure 2:
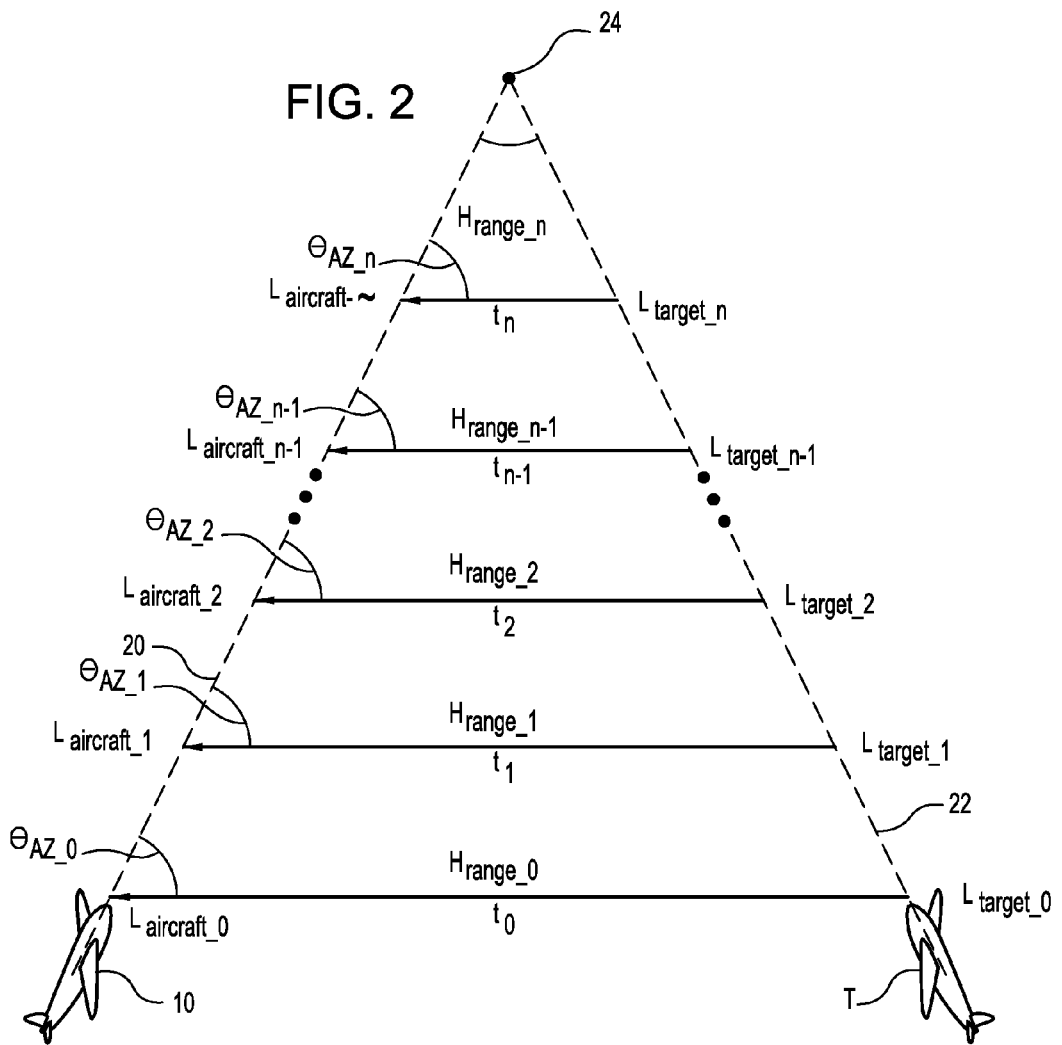
FIG. 2 is an overhead view of a tactical fighter aircraft and a target aircraft having converging headings.
Figure 3:
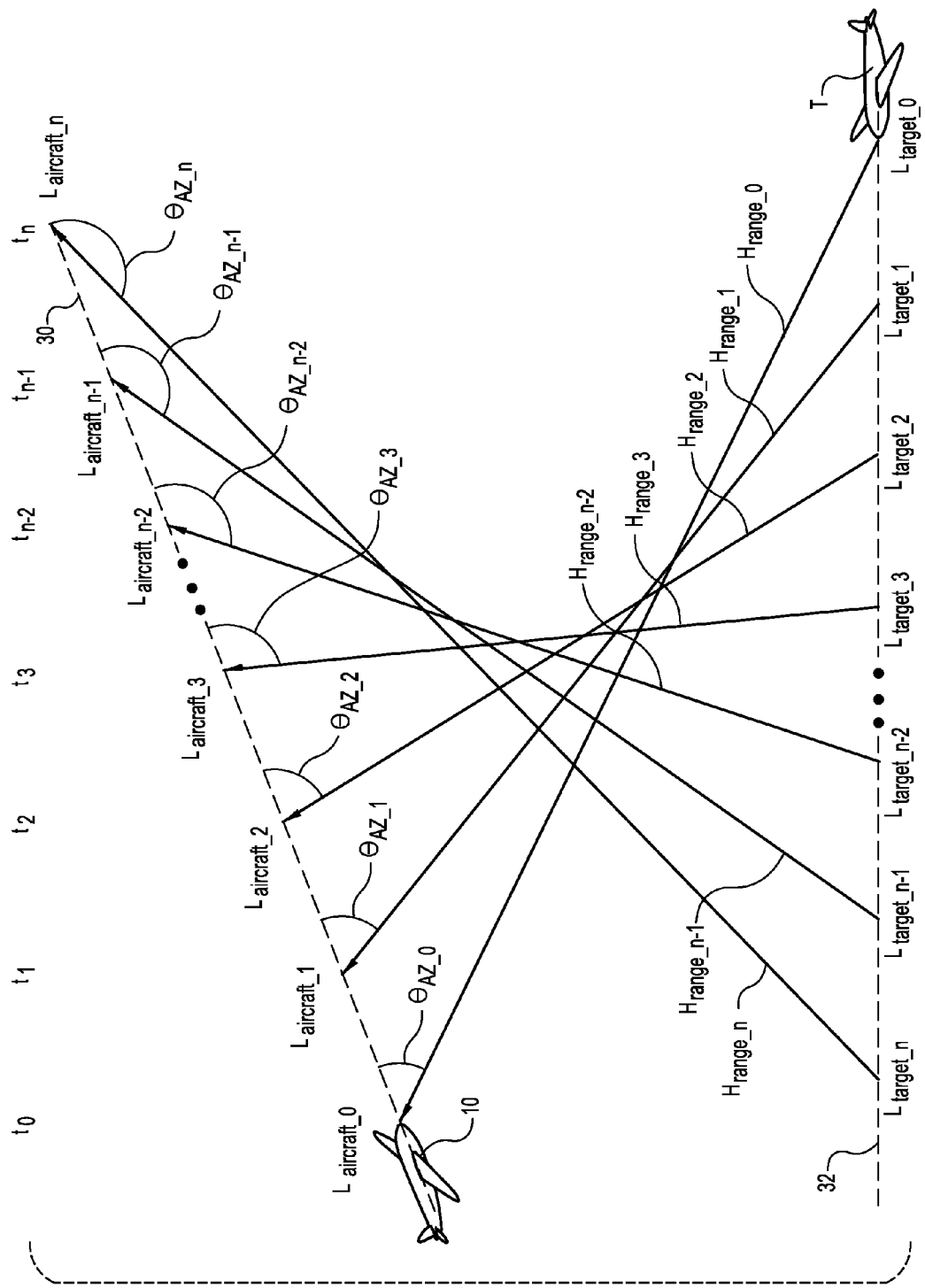
FIG. 3 is an overhead view of a tactical fighter aircraft and a target aircraft having diverging headings.

But before describing an embodiment of this technique, other potentially unsuitable techniques are described in conjunction with FIGS. 1-3.

FIG. 1 is an overhead view of a tactical fighter aircraft 10 traveling at a first heading 12, at a first constant speed $SPE_{aircraft}$, and at a first level altitude $ALT_{aircraft}$, and of a target aircraft T traveling at a second heading 14, at a second constant speed $SPE_{target}$, and at a second level altitude $ALT_{target}$, where the second heading is in a direction opposite (180°) to the first heading 12—in the example illustrated in FIG. 1, $SPE_{target}=SPE_{aircraft}$, although the below description holds even if $SPE_{target} \neq SPE_{aircraft}$. At each sample time $t_0$-$t_n$, the aircraft 10 is at a respective location $L_{aircraft\_0}$-$L_{aircraft\_n}$, and the target T is at a respective location $L_{target\_0}$-$L_{target\_n}$, at a respective azimuth angle $\theta_{AZ\_0}$-$\theta_{AZ\_n}$ relative to the first heading 12, and at a respective "horizontal" azimuth range $H_{RANGE\_0}$-$H_{RANGE\_n}$ from the aircraft. Geometrically speaking, each "horizontal" azimuth range $H_{RANGE}$ is a projection of the actual, i.e., slant, range (not shown in FIG. 1) from the aircraft 10 to the target T in both the aircraft's azimuth plane (the plane in which the aircraft is flying) and in all earth azimuth planes, because the aircraft is flying at a substantially level altitude, i.e., is flying substantially parallel to the earth's surface. For purposes of discussion, the aircraft's azimuth plane is a plane that passes through the fuselage of the aircraft 10 from nose to tail and in which both of the aircraft's wings lie or to which both of the aircraft's wings are parallel (assuming that the aircraft is flying level and is not making a turn or other maneuver). An earth azimuth plane is any plane that is parallel to the earth's surface, or, more precisely, any plane that is perpendicular to a radius line of the earth. Therefore, when the aircraft 10 is flying at a level altitude, the aircraft's azimuth plane is either coincident with or parallel to a selected earth azimuth plane depending on the altitude of the selected plane. That is, if the altitude of a selected earth azimuth plane is the same as the level altitude of the aircraft 10, then the aircraft's azimuth plane can be said to be coincident with the earth azimuth plane; but if the altitudes of the selected earth azimuth plane and the aircraft's azimuth plane are different, then these planes are parallel to, but not coincident with, each other. It is sometime convenient to select the earth azimuth plane in which the target T lies as the earth azimuth plane for target-ranging calculations.

The pilot of the aircraft 10 may want to obtain accurate, real-time estimates of the azimuth angles $\theta_{AZ\_0}$-$\theta_{AZ\_n}$ and the "horizontal" azimuth ranges $H_{RANGE\_0}$-$H_{RANGE\_n}$ in a relatively short period of time after the aircraft's onboard electronic warfare system (EWS) (not shown in FIG. 1) detects the target T so that the pilot will have sufficient time to take appropriate action regarding the target. For example, depending on the situation, the pilot may decide to stay on the first heading 12, to make an evasive maneuver to evade the target T, e.g., before the target detects the aircraft 10, or to destroy the target by, e.g., firing a standoff air-to-air missile (AAM) at the target. Although the pilot may also want to obtain accurate real-time estimates of the elevation angles and slant ranges (neither shown in FIG. 1) of the target T relative to the aircraft 10, having estimates of only the azimuth angles $\theta_{AZ\_0}$-$\theta_{AZ\_n}$ and the azimuth ranges $H_{RANGE\_0}$-$H_{RANGE\_n}$ is sufficient for many pilot actions such as those described immediately above.

But for purposes, e.g., of stealth, the pilot of the aircraft 10 may want to obtain the estimates of the azimuth angles $\theta_{AZ\_0}$-$\theta_{AZ\_n}$ and the "horizontal" azimuth ranges $H_{RANGE\_0}$-$H_{RANGE\_n}$ "passively," i.e., without emitting radar or other signals from the aircraft, as described above. If the aircraft 10 emits radar signals, then it is possible that the target T may detect the aircraft via detection of these radar signals, and such detection may eliminate any tactical advantage that the pilot of the aircraft may have otherwise had. But if the aircraft 10 ranges the target T by receiving and analyzing signals emanating (e.g., emitted or reflected) from the target T, then the pilot of the aircraft may retain his/her tactical advantage. Examples of signals that the target T may emit include radar signals that the target T transmits, and infrared heat signals that the target transmits by virtue of the friction between its fuselage and the air (or other medium through which it is traveling). And examples of signals that the target T may reflect include radar signals transmitted from a source other than the target and the aircraft 10.

One technique that the EWS (not shown in FIG. 1) onboard the aircraft 10 may implement to determine passively the azimuth angles $\theta_{AZ\_0}$-$\theta_{AZ\_n}$ and the azimuth ranges $H_{RANGE\_0}$-$H_{RANGE\_n}$ is to determine the azimuth angles by receiving the signals from the target T with one or more direction-finding antennas (not shown in FIG. 1), and to determine the azimuth ranges by measuring the amplitudes, and detecting the signature, of these signals. The signature of the signals from the target T indicates the power at which these signals are transmitted, and the amplitudes of these signals indicate the power of these signals when received at the aircraft 10. Therefore, by applying a conventional signal-attenuation function to the transmitted-signal power and the received-signal amplitudes (and possibly to elevation angles between the aircraft 10 and the target T), the EWS onboard the aircraft can estimate the azimuth ranges $H_{RANGE\_0}$-$H_{RANGE\_n}$ as being proportional to the estimated signal attenuation (i.e., the lower the attenuation the closer the azimuth range, and the higher the attenuation the farther the azimuth range).

But unfortunately, many electronic warfare systems (EWSs) cannot accurately determine the amplitude of a received signal (at least not accurately enough for ranging purposes), and even those EWSs that can accurately determine the amplitude of a received signal may be unable to do so under certain conditions (e.g., severe weather disturbances, the range between the aircraft 10 and the target T exceeds a threshold, or the transmitted-signal power is too low) or within a time window sufficient to allow the aircraft pilot to take appropriate action regarding the target.

Consequently, it would be desirable, at least in some situations, for the EWS, or another computing apparatus, onboard the aircraft 10 to be able to determine the azimuth ranges $H_{RANGE\_0}$-$H_{RANGE\_n}$ without relying on, i.e., independently of, the amplitudes of the signals passively received from the target T.

For example, one such proposed technique is for a computing apparatus onboard the aircraft 10 to determine the azimuth ranges $H_{RANGE\_0}$-$H_{RANGE\_n}$ from only the azimuth angles $\theta_{AZ\_0}$-$\theta_{AZ\_n}$, which most EWSs can measure accurately enough for ranging purposes.

But unfortunately, this technique may be unsuitable for situations in which both the aircraft 10 and the target T are traveling at approximately constant velocities. For example, assume that the aircraft 10 is traveling along the heading 12 at the same speed at which the target T is travelling along the heading 14. It can be shown mathematically that from the azimuth angles $\theta_{AZ\_0}$-$\theta_{AZ\_n}$, a computing apparatus can determine that the target T is travelling at the same speed as the aircraft 10 is travelling, and is travelling along a straight line (i.e., a constant heading) that is parallel to the straight line along which the aircraft is travelling. But it can also be shown mathematically that the computing apparatus cannot determine how far apart these two parallel paths are from each other, and, therefore, cannot determine the azimuth ranges $H_{RANGE\_0}$-$H_{RANGE\_n}$. This is true even if the aircraft 10 and the target T are travelling at different speeds along the headings 12 and 14, respectively, and is also true if the aircraft and target are flying straight toward each other at opposite headings at any speeds. And although at some point the aircraft 10 may come close enough to the target T for the pilot of the aircraft to see the target and to make a visual estimation of the azimuth range to the target, being within visual range of the target may eliminate at least some of the actions (e.g., stealth, firing a missile) that the pilot may have been otherwise able to take regarding the target.

Although this technique may be suitable for situations in which the target T is travelling at a changing velocity (i.e., is accelerating or decelerating) relative to the aircraft 10, it has been discovered from years of empirical data that aircraft typically fly straight and at an approximately constant velocity for the majority of the time that they are airborne; therefore, this technique may be unsuitable for ranging an airborne target from an aircraft in the vast majority of situations.

FIG. 2 is an example of another situation for which the above-described technique of computing azimuth ranges from only azimuth angles may be unsuitable.

FIG. 2 is an overhead view of the aircraft 10 traveling at a first heading 20, at a first constant speed $SPE_{aircraft}$, and at a first level altitude $ALT_{aircraft}$, and of the target T traveling at a second heading 22, at a second constant speed $SPE_{target}$, and at a second level altitude $ALT_{target}$, where the azimuth-plane projections of the first and second headings intersect at a point 24—in the example illustrated in FIG. 2, $SPE_{target}$=$SPE_{aircraft}$, although the below description holds even if $SPE_{target} \neq SPE_{aircraft}$. At each sample time $t_0$-$t_n$, the aircraft 10 is at a respective location $L_{aircraft\_0}$-$L_{aircraft\_n}$, and the target T is at a respective location $L_{target\_0}$-$L_{target\_n}$, at a respective azimuth angle $\theta_{AZ\_0}$-$\theta_{AZ\_n}$ relative to the first heading 20, and at a respective azimuth range $H_{RANGE\_0}$-$H_{RANGE\_n}$ from the aircraft. Because $SPE_{target}$=$SPE_{aircraft}$, it can be shown mathematically that $\theta_{AZ\_0}$=$\theta_{AZ\_1}$=$\theta_{AZ\_2}$=...=$\theta_{AZ\_n}$.

As described above for the example aircraft and target headings 12 and 14 of FIG. 1, it may not be possible for a computing apparatus onboard the aircraft 10 to compute the "horizontal" azimuth ranges $H_{RANGE\_0}$-$H_{RANGE\_n}$ from only the azimuth angles $\theta_{AZ\_0}$-$\theta_{AZ\_n}$ for the aircraft and target headings 20 and 22. Because $\theta_{AZ\_0}$=$\theta_{AZ\_1}$=$\theta_{AZ\_2}$=...=$\theta_{AZ\_n}$, the azimuth angles provide no information from which the computing apparatus can determine the azimuth ranges. Furthermore, not only would the computing apparatus be unable to determine the azimuth ranges $H_{RANGE\_0}$-$H_{RANGE\_n}$, it can be shown mathematically that the computing apparatus would be unable to determine even whether the aircraft 10 and target T were flying toward each other along intersecting (at least in the azimuth plane) headings 20 and 22 per FIG. 2, or were flying parallel to each other along parallel headings. And this is true even if the aircraft 10 and the target T are travelling at different speeds along the headings 20 and 22 or the parallel headings, respectively.

FIG. 3 is an example of yet another situation for which the above-described technique of computing azimuth ranges from only azimuth angles may be unsuitable.

FIG. 3 is an overhead view of the aircraft 10 traveling at a first heading 30, at a first constant speed $SPE_{aircraft}$, and at a first level altitude $ALT_{aircraft}$, and of the target T traveling at a second heading 32, at a second constant speed $SPE_{target}$, and at a second level altitude $ALT_{target}$—in the example illustrated in FIG. 3, $SPE_{target}$=$SPE_{aircraft}$, although the below discussion holds even if $SPE_{target} \neq SPE_{aircraft}$. At each sample time $t_0$-$t_n$, the aircraft 10 is at a respective location $L_{aircraft\_0}$-$L_{aircraft\_n}$, and the target T is at a respective location $L_{target\_0}$-$L_{target\_n}$, at a respective azimuth angle $\theta_{AZ\_0}$-$\theta_{AZ\_n}$ relative to the first heading 30, and at a respective azimuth range $H_{RANGE\_0}$-$H_{RANGE\_n}$ from the aircraft.

As described above for the example aircraft and target headings 12 and 14 of FIGS. 1 and 20 and 22 of FIG. 2, it may not be possible for a computing apparatus onboard the aircraft 10 to compute the azimuth ranges $H_{RANGE\_0}$-$H_{RANGE\_n}$ from only the azimuth angles $\theta_{AZ\_0}$-$\theta_{AZ\_n}$ for the aircraft and target headings 30 and 32. For example, as described above in conjunction with FIG. 1, it can be shown mathematically that any heading parallel to the target heading 32 would yield the same azimuth angles $\theta_{AZ\_0}$-$\theta_{AZ\_n}$. And this is true even if the aircraft 10 and the target T are travelling at different constant speeds along the headings 30 and 32, respectively.

Referring again to FIGS. 1-3, even when using a proven technique (e.g., using reliable signal amplitude in conjunction with azimuth angles) to determine the azimuth ranges $H_{RANGE\_0}$-$H_{RANGE\_n}$ from the aircraft 10 to the target T, a computing apparatus onboard the aircraft may be unable to provide, on a consistent basis, sufficiently accurate values for the azimuth ranges within a time window sufficient for a pilot of the aircraft to take appropriate action regarding the target.

And the difficulty of determining sufficiently accurate azimuth ranges $H_{RANGE\_0}$-$H_{RANGE\_n}$ within a suitably short time window may be exacerbated when the target T maneuvers, and thus deviates from a straight-line heading such as the straight-line headings shown in FIGS. 1-3.

Figure 4:
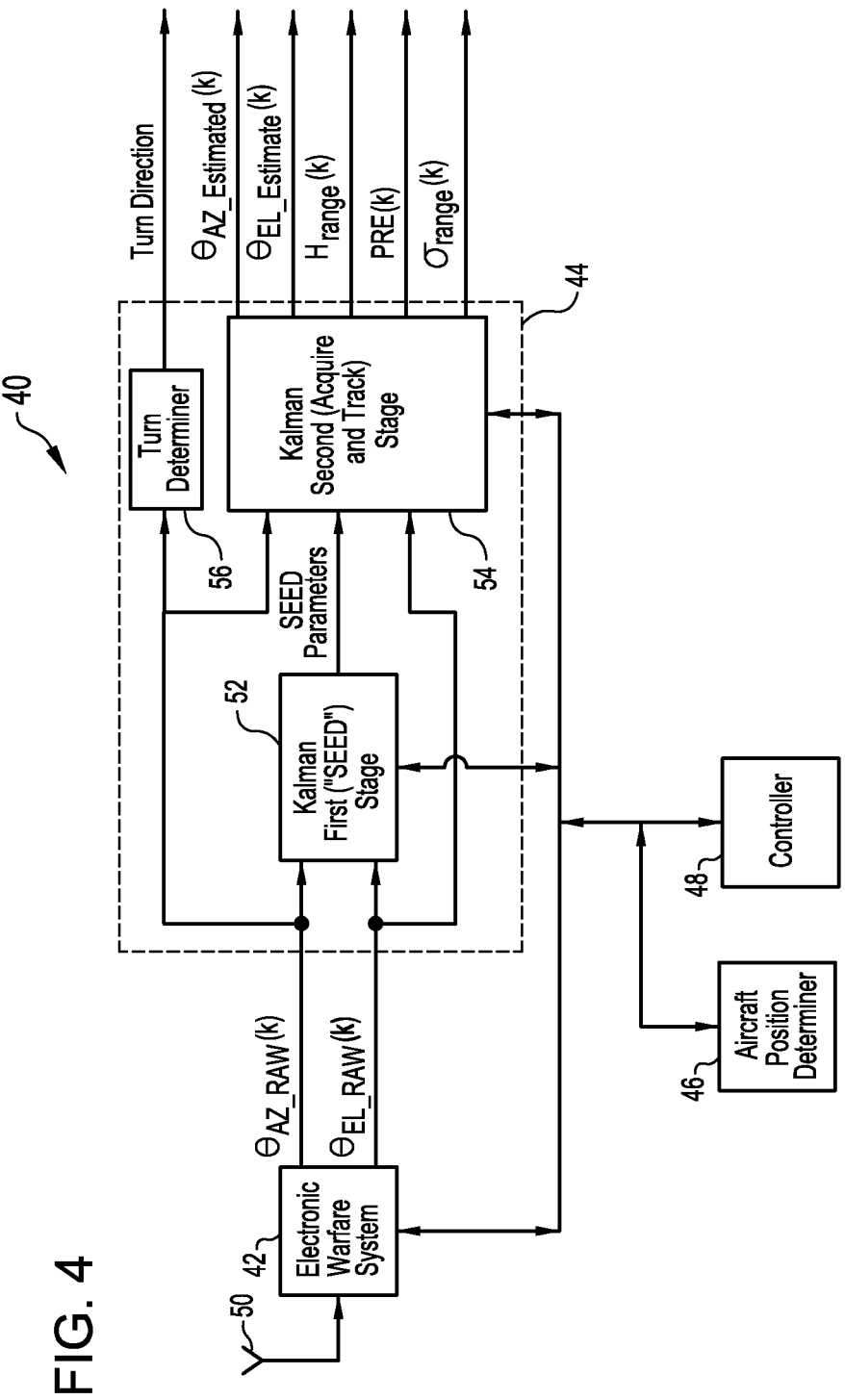
FIG. 4 is a block diagram of an apparatus that may be located on the tactical fighter jet of FIGS. 1-3 and that is configured to range the target aircraft of FIGS. 1-3 passively according to an embodiment.

FIG. 4 is a diagram of a computing apparatus 40 that is configured to generate, passively, an estimate of the range to an airborne target from a moving object, such as the aircraft 10 of FIGS. 1-3, with an accuracy and a speed sufficient to allow a pilot of the aircraft to take appropriate action regarding the target. For example, the computing apparatus 40 can determine and update an estimate of the azimuth range between an aircraft and one or more airborne targets (e.g., the target T of FIGS. 1-3) within a sufficiently short time window, and independently of the passive target-signal amplitude, even when one or both of the aircraft and target maneuver, or otherwise deviate, from a straight-line path in an azimuth plane. Furthermore, the computing apparatus 40 may be located on board the aircraft or in any other suitable location.

In summary, an embodiment of the computing apparatus 40 accomplishes these tasks by "doing" at least one of the following:

(1) "assuming" that the one or more targets are each traveling along a straight-line, fixed-altitude heading, or are maneuvering in the azimuth plane;

(2) determining a coarse azimuth range first, and using information corresponding to the coarse range to lock onto, and to subsequently track, the azimuth range; and (3) prompting the aircraft pilot to maneuver the aircraft in a manner that allows the computing apparatus to determine a sufficiently accurate azimuth range within a sufficiently short time window independently of the amplitudes of the passive signals received from the one or more targets.

Still referring to FIG. 4, the computing apparatus 40 includes a conventional electronic warfare system (EWS) 42, a range finder 44, an aircraft-position determiner 46, and a controller 48.

The EWS 42 may be conventional, and is configured to receive passive target signals from one or more targets via an antenna 50, and to provide at least azimuth angles $\theta_{AZ\_Raw}(k)$ and elevation angles $\theta_{EL\_Raw}(k)$ to the one or more targets relative to the aircraft heading—"k" refers to the time at which the passive signals are sampled, and is described below in more detail.

The range finder 44 includes a first stage 52, a second stage 54, and a turn determiner 56.

The first stage 52 is configured to receive at least $\theta_{AZ\_Raw}(k)$ and $\theta_{EL\_Raw}(k)$ from the EWS 42, to receive at least the coordinates and component velocities (e.g., coordinates x, y, and z and component velocities $\dot{x}$, $\dot{y}$, and $\dot{z}$) of the aircraft containing the computer apparatus 40 from the position determiner 46, to provide "seeding" parameters to the second stage 54, and includes a bank of coarse-range determiners. Each coarse-range determiner includes, or otherwise implements, a Kalman filter that "assumes" that an airborne target is traveling along a straight-line heading in an azimuth plane, and that is loaded with initial filter parameters (e.g., filter coefficients and initial values for the target coordinates x, y, and z and component velocities $\dot{x}$, $\dot{y}$, and $\dot{z}$) that are "tuned" to a respective azimuth range. For example, the initial filter parameters of a first filter may be tuned to an azimuth range of ten nautical miles, the initial filter parameters of a second filter may be tuned to an azimuth range of twenty nautical miles, . . . , and the initial filter parameters of a fifteenth and final filter may be tuned to an azimuth range of one hundred fifty nautical miles. As described in more detail below, after a period of operation (e.g., ten seconds) of all of these coarse-range filters, the filter that was initially tuned to the azimuth range closest to the actual azimuth range of a target provides its filter parameters to "seed" the second stage 54.

The second stage 54 is configured to receive at least $\theta_{AZ\_Raw}(k)$ and $\theta_{EL\_Raw}(k)$ from the EWS 42, to receive at least the coordinates and component velocities (e.g., coordinates x, y, and z and component velocities $\dot{x}$, $\dot{y}$, and $\dot{z}$) of the aircraft from the position determiner 46, to receive at least the above-described filter "seeding" parameters from the first stage 52, and to provide estimated values for at least $\theta_{AZ\_Estimated}(k)$, $\theta_{EL\_Estimated}(k)$, $H_{RANGE}(k)$, the percentage range error (PRE(k)) in $H_{Range}(k)$, and the standard deviation $\sigma_{Range}(k)$ in $H_{Range}(k)$, to the pilot of the aircraft (the second stage may also provide, e.g., a slant range, and the PRE and the standard deviation $\sigma$ in the slant range). $\theta_{AZ\_Estimated}(k)$ and $\theta_{EL\_Estimated}(k)$ may be more accurate than $\theta_{AZ\_Raw}(k)$ and $\theta_{EL\_Raw}(k)$ from the EWS 42, because $\theta_{AZ\_Estimated}(k)$ and $\theta_{EL\_Estimated}(k)$ may have reduced levels of noise and other errors due to the filtering action of the second stage 54 (this may also be true for any other estimates of EWS measurements that the second stage provides). Furthermore, one or more of the estimates output by the second stage 54 may be further filtered/smoothed by a filter such as described in U.S. patent application Ser. No. 12/498,310, filed 6 Jul. 2009, titled QUANTITY SMOOTHER, and which is incorporated by reference, before providing these estimates to, e.g., a display, for viewing by the pilot. The second stage 54 is further described below in conjunction with FIG. 5.

And the turn determiner 56 is configured to determine, in response to the azimuth angle $\theta_{AZ\_Raw}(k)$, a turn direction that the pilot of the aircraft can make to speed convergence of the first and/or second stages 52 and 54 to sufficiently accurate values for $\theta_{AZ\_Estimated}(k)$, $\theta_{EL\_Estimated}(k)$, $H_{Range}(k)$, PRE(k), and $\sigma_{Range}(k)$. Determining the turn direction is further discussed below in conjunction with FIG. 6.

Still referring to FIG. 4, the position determiner 46 is configured to determine at least the coordinates and component velocities (e.g., coordinates x, y, and z and component velocities $\dot{x}$, $\dot{y}$, and $\dot{z}$) of the aircraft containing the computing apparatus 40 at regular intervals (e.g., 200 Hz). For example, the position determiner 46 may include global-positioning-satellite (GPS) hardware that implements a GPS technique to make these determinations. Furthermore, using, e.g., a GPS technique or an onboard gyroscope, the position determiner 46 may also determine, and provide to the range finder 44, a spatial orientation of the aircraft in terms of spatial-orientation components such as pitch, yaw, and roll.

And the controller 48 is configured to control the EWS 42, range finder 44, and position determiner 46, and may also be configured to control one or more other components of the computing apparatus 40. For example, the controller 48 may include one or more microprocessors or microcontrollers.

The EWS 42, range finder 44, position determiner 46, controller 48 and other components of the computing apparatus 40 may be implemented in hardware, software, firmware, or a combination of two or more of hardware, software, and firmware. For example, one or more of the EWS 42, range finder 44, and position determine 46 may be implemented in software that the controller 48 executes, or may be formed by respective electronic circuits.

Still referring to FIG. 4, alternate embodiments of the computing apparatus 40 are contemplated. For example, the stages 52 and 54 of the range finder 44 may implement algorithms other than Kalman-filter algorithms. Furthermore, the position determiner 46 may provide aircraft-position indicators, such as acceleration components $\ddot{x}$, $\ddot{y}$, and $\ddot{z}$, in addition to the position indicators described above.

Figure 5:
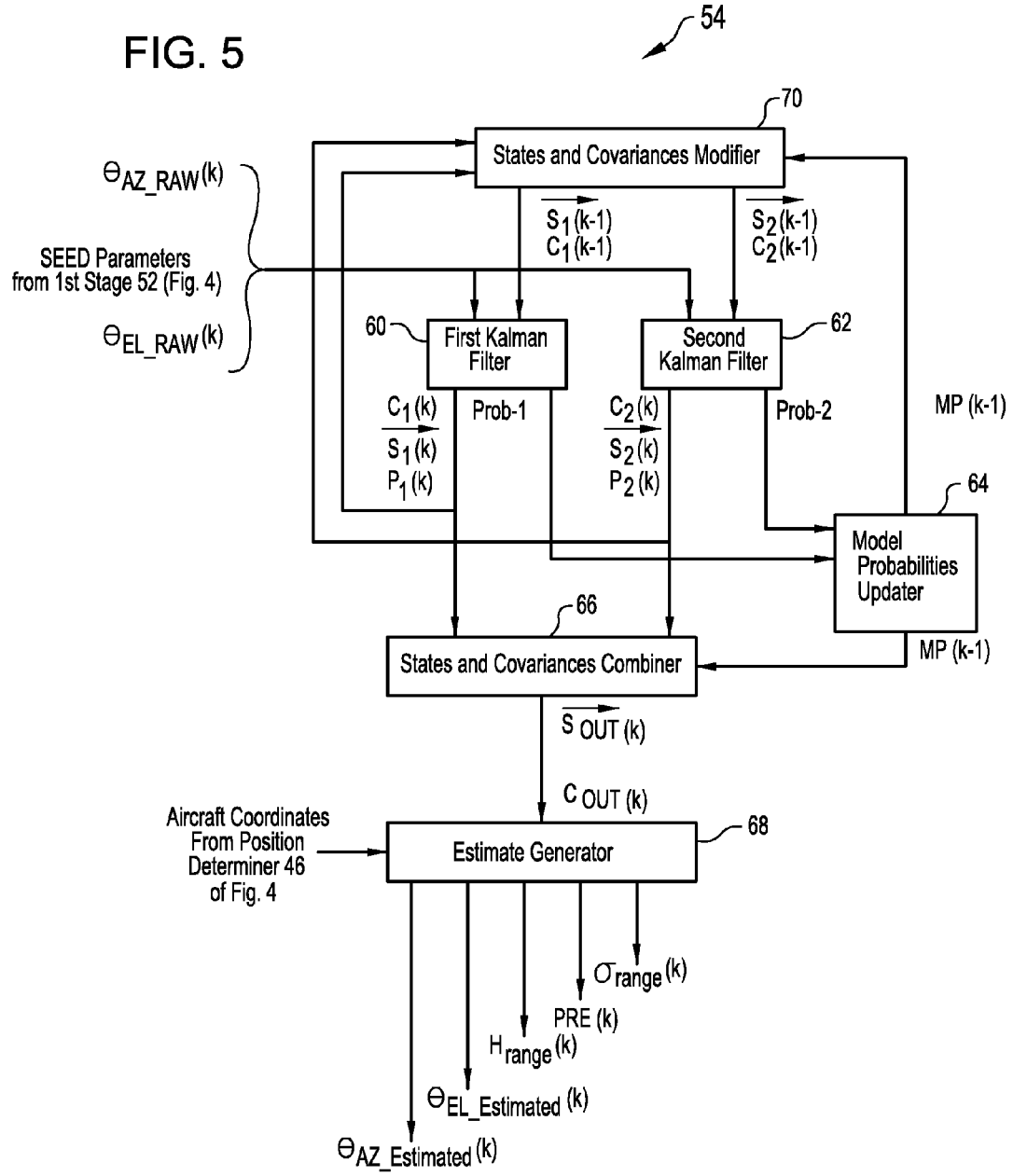
FIG. 5 is a block diagram of the second stage of the range finder of FIG. 4 according to an embodiment.

FIG. 5 is a diagram of the second stage 54 of the range finder 44 of FIG. 4 according to an embodiment.

The second stage 54 includes first and second Kalman filters 60 and 62, a model-probabilities updater 64, a states-and-covariances combiner 66, an estimate generator 68, and a states-and-covariances modifier 70. Although each of these components may implement a respective one or more complex mathematical functions, the below description eschews a complex mathematical description in lieu of a functional description, it being understood that one of ordinary skill in the art of Kalman filtering would understand the mathematics that give rise to the described functions.

The first Kalman filter 60 is configured to model a detected target as traveling in a straight line, at a constant velocity, and at a level altitude from one sample time k to another sample time k, because years of empirical data indicate that except when maneuvering, an aircraft and other airborne targets spend the vast majority of their flight times in straight, constant-velocity, level flight. Put another way, the first filter 60 is configured to "assume" that the target is flying in a straight, constant-velocity, level flight path, at least between consecutive sample times k. Each sample time k corresponds to the times (e.g., five to ten sample times k per second) when the EWS 42 (FIG. 4) receives and processes respective passive signals from the target, and generates, e.g., a value for $\theta_{AZ\_Raw}(k)$ and a value for $\theta_{EL\_Raw}(k)$ in response to each of these processed signals. Typically, the intervals between sample times k are approximately constant, but this is not required for the first filter 60 to operate as described.

Because the first filter 60 is configured to model the target's flight path as being straight, constant-velocity, and level between consecutive sample times k, the first filter is configured to model the position and velocity of the target itself with the following six state variables, which the first filter is configured to update at each sample time k: target-position coordinates x, y, and z, and target-velocity components $\dot{x}$, $\dot{y}$, and $\dot{z}$. These state variables form the elements of a first Kalman state vector $\vec{s}_1(k)$.

The first filter 60 is configured to update the model of the target's flight path (e.g., update the modeled heading, velocity, and/or altitude of the target's flight path), in response to the measured azimuth angle $\theta_{AZ\_Raw}(k)$ from the EWS 42 (FIG. 4). At each sample time k, the first filter 60 is configured to update the values of the elements of the state vector $\vec{s}_1(k)$ for the target based on the model, to determine a modeled value for the azimuth angle to the target in response to the updated state vector $\vec{s}_1(k)$, and to compare the modeled value of the azimuth angle with the value of the azimuth angle $\theta_{AZ\_Raw}(k)$ measured by the EWS 42. The difference between the modeled azimuth-angle value and the measured azimuth value $\theta_{AZ\_Raw}(k)$ represents an error between the actual position of the target and the modeled position of the target at sample time k. In response to this azimuth-angle error, the first filter 60 is configured to modify the model of the target's flight path (e.g., to modify the heading, velocity, and/or altitude of the modeled flight path) in a way that should tend to reduce the azimuth-angle error at the next sample time k. But the first filter 60 is configured to implement, in effect, an error-correction loop that has a relatively low bandwidth, which means that the error-correction loop is configured to modify the model relatively slowly in response to a nonzero azimuth-angle error. Or, put in Kalman-filter terms, the first filter 60 has a covariance matrix $C_1(k)$, which effectively represents the error in each of the state variables that form the state vector $\vec{s}_1(k)$, which the first filter updates at each sample time k in response to the azimuth-angle error per above, and also has a matrix $Q_1(k)$, by which the covariance matrix $C_1(k)$ is multiplied to generate values for modifying the target's flight-path model so as to reduce the azimuth-angle error. So that the first filter 60 is configured to modify the flight-path model relatively slowly per above, the elements of $Q_1(k)$ are relatively small, and, in an embodiment, may be close to zero. Modifying the modeled flight path relatively slowly allows, for example, the first filter 60 to filter noise from the measured values of $\theta_{AZ\_Raw}(k)$ from the EWS 42 (FIG. 4). The first filter 60 may be configured to modify the elements of $Q_1(k)$ in response to the intervals between sample times k. For example, the shorter this interval, the larger the first filter 60 may be configured to make the elements of $Q_1(k)$, and the larger this interval, the smaller the first filter may make the elements of $Q_1(k)$ so as prevent instability in the filtering algorithm. The first filter 60 may also be similarly configured to modify the model of the target's flight path in response to the modeled elevation values $\theta_{EL\_Estimated}(k)$ and the measured elevation values $\theta_{EL\_Raw}(k)$, although in an embodiment the first filter 60 is configured to monitor these elevation values only to discriminate multiple targets by their elevation angle relative to the aircraft as described below in conjunction with FIG. 9. A reason for this is that the elevation angle $\theta_{EL\_Raw}(k)$ may change too slowly for the first filter 60 to track—the effect of the rate of change in an angle on the convergence of the second stage 54 is described below in conjunction with FIG. 6.

The first Kalman filter 60 is also configured to generate the following two probability indicators at each sample time k: Prob_1(k), which is a scalar, and $P_1(k)$, which is a matrix.

The value of Prob_1(k) indicates the likelihood that, at sample time k, the target is on the modeled flight path. For example, if the above-described azimuth error is below a first threshold, then the value of Prob_1(k) may indicate a relatively high likelihood that the target is on the modeled flight path at the sample time k; alternatively, if the above-described azimuth error is above a second threshold, then the value of Prob_1(k) may indicate a relatively low likelihood that the target is on the modeled flight path at the sample time k.

And, the values of the elements of the matrix $P_1(k)$ indicate the likelihoods of the following four scenarios:

1) the target is currently on the flight path modeled by the first filter 60, and will stay on this flight path between sample times k and k+1;

2) the target is currently on the flight path modeled by the first filter, but will shift to a flight path modeled by the second filter 62 (this modeled flight path is discussed below) between the sample times k and k+1;

3) the target is currently on the flight path modeled by the second filter 62, and will stay on this flight path between sample times k and k+1; and 4) the target is currently on the flight path modeled by the second filter, but will shift to the flight path modeled by the first filter between the sample times k and k+1.

In addition to receiving $\theta_{AZ\_Raw}(k)$ and $\theta_{EL\_Raw}(k)$ from the EWS 42 (FIG. 4), the first filter 60 also receives, as described above, initial, i.e., "seed", parameters from the Kalman filter of the first stage 52 associated with an azimuth range that most closely corresponds to the azimuth range of the target. These parameters include initial values for the elements of the state vector $\vec{s}_1(k)$, for the elements of the covariance matrix $C_1(k)$, and for other variables such as filter coefficients. These seed values may allow the first filter 60 to converge its model of the target's flight path to the actual flight path of the target more quickly than it would without these seed values; therefore, these seed values aid the second stage 54 in converging to a value of $H_{Range}(k)$ that is sufficiently accurate within a time window that is sufficiently short for a pilot to take appropriate action regarding a target.

The second Kalman filter 62 is configured to model a detected target as turning, i.e., maneuvering, in an azimuth plane and at a level altitude from one sample time k to another sample time k, because, as indicated by years of empirical data, when an aircraft and other airborne targets are not in straight, constant-velocity, level flight, they are typically maneuvering to change their headings. Put another way, unlike the first filter 60, the second filter 62 is configured to "assume" that the target is maneuvering, at least between consecutive sample times k. As discussed above, although the intervals between sample times k are typically approximately constant, this is not required for the second filter 62 to operate as described.

The second filter 62 models the target as having a curved, level flight path between sample times k with the same six state variables x, y, and z, and $\dot{x}$, $\dot{y}$, and $\dot{z}$ with which the first filter 60 models the target as having a straight, level, and constant-velocity flight path. These state variables form the elements of a second Kalman state vector $\vec{s}_2(k)$.

The second filter 62 is configured to update the model of the target's flight path (e.g., to update the modeled heading, velocity, and/or altitude of the target's flight path), in response to the measured azimuth angle $\theta_{AZ\_Raw}(k)$ from the EWS 42 (FIG. 4). At each sample time k, the second filter 62 is configured to update the values of the elements of the state vector $\vec{s}_2(k)$ for the target based on the model, to determine a modeled value for the azimuth angle to the target in response to the updated state vector $\vec{s}_2(k)$, and to compare the modeled value of the azimuth angle with the value $\theta_{AZ\_Raw}(k)$ measured by the EWS 42. The difference between the modeled azimuth-angle value and the measured azimuth value $\theta_{AZ\_Raw}(k)$ represents an error between the actual position of the target and the modeled position of the target at sample time k. In response to this error, the second filter 62 is configured to modify the model of the target's flight path (e.g., to modify the heading, velocity, and/or altitude of the modeled flight path) in a way that should tend to reduce the azimuth-angle error at the next sample time k. But unlike the first filter 60, the second filter 62 is configured to implement, in effect, an error-correction loop that has a relatively moderate to high bandwidth, which means that the error-correction loop is configured to modify the model relatively quickly in response to a nonzero azimuth-angle error. Or, put in Kalman-filter terms, the second filter 62 has a covariance matrix $C_2(k)$, which effectively represents the error in each of the state variables that form the state vector $\vec{s}_2(k)$ at sample time k and which is updated at each sample time k in response to the azimuth-angle error per above, and also has a matrix $Q_2(k)$, by which $C_2(k)$ is multiplied to generate values for modifying the target's flight-path model so as to reduce the azimuth-angle error. So that the second filter 62 can modify the flight-path model relatively quickly per above, the elements of $Q_2(k)$ are relatively moderate to large. Modifying the modeled flight path relatively quickly allows, for example, the second filter 62 to track the flight path of the maneuvering target. Because the target is changing its heading, it is more important for the second filter 62 to track the target's flight path until it returns to a straight, constant-velocity, and level flight path than it is for the second filter to filter noise from the measured values $\theta_{AZ\_Raw}(k)$ from the EWS 42. The second filter 62 may be configured to modify the elements of $Q_2(k)$ in response to the intervals between sample times k. For example, the shorter this interval, the larger the second filter 62 may be configured to make the elements of $Q_2(k)$, and the larger this interval, the smaller the first filter may make the elements of $Q_2(k)$ so as prevent instability in the filtering algorithm. The second filter 62 may also be similarly configured to modify the model of the target's flight path in response to the modeled elevation values $\theta_{EL\_Estimated}(k)$ and the measured elevation values $\theta_{EL\_Raw}(k)$, although in an embodiment the second filter 62 is configured to monitor these elevation values only to discriminate multiple targets by their elevation angles relative to the aircraft as described below in conjunction with FIG. 9. A reason for this is that the elevation angle $\theta_{EL\_Raw}(k)$ may change too slowly over a short time interval (e.g., from sample k to sample k) for the second filter 62 to track.

The second Kalman filter 62 also generates the following two probability indicators at each sample time k: Prob_2(k), which is a scalar, and $P_2(k)$, which is a matrix.

The value of Prob_2(k) indicates the likelihood that, at sample time k, the target is on the flight path modeled by the second Kalman filter 62. For example, if the above-described azimuth error is below a first threshold, then the value of Prob_2(k) may indicate a relatively high likelihood that the target is on the modeled flight path at the sample time k; alternatively, if the above-described azimuth error is above a second threshold, then the value of Prob_2(k) may indicate a relatively low likelihood that the target is on the modeled flight path at the sample time k.

And, the values of the elements of the matrix $P_2(k)$ indicate the likelihoods of the following four scenarios, which are the same scenarios described above in conjunction with the matrix $P_1(k)$ of the first filter 60:

1) the target is currently on the flight path modeled by the first filter 60, and will stay on this flight path between sample times k and k+1;

2) the target is currently on the flight path modeled by the first filter, but will shift to a flight path modeled by the second filter 62 between the sample times k and k+1;

3) the target is currently on the flight path modeled by the second filter, and will stay on this flight path between sample times k and k+1; and 4) the target is currently on the flight path modeled by the second filter, but will shift to the flight path modeled by the first filter between the sample times k and k+1.

Even though the matrices $P_1(k)$ and $P_2(k)$ indicate the probabilities of the same four scenarios, the values of the elements of $P_1(k)$ are typically different than the values of the elements of $P_2(k)$, at least because the first and second filters 60 and 62 implement different filtering algorithms.

Furthermore, in addition to receiving $\theta_{AZ\_Raw}(k)$ and $\theta_{EL\_Raw}(k)$ from the EWS 42 (FIG. 4), the second filter 62 also receives initial, i.e., "seed", parameters from the Kalman filter of the first stage 52 associated with an azimuth range that most closely corresponds to the azimuth range of the target. These parameters include initial values for the elements of the state vector $\vec{s}_2(k)$, for the elements of the covariance matrix $C_2(k)$, and for other variables such as filter coefficients. These seed values may allow the second filter 62 to converge its model of the target's flight path to the actual flight path of the target more quickly than it would without these seed values; therefore, these seed values aid the second stage 54 in converging to a value of $H_{Range}(k)$ that is sufficiently accurate within a time window that is sufficiently short for a pilot to take appropriate action regarding a target.

Still referring to FIG. 5, in response to the values of Prob_1 and Prob_2, the model-probabilities updater 64 generates an indication MP(k−1) of whether, at sample time k, the actual flight path of the target conforms more to the straight flight path modeled by the first filter 60 or to the curved flight path modeled by the second filter 62. The "(k−1)" indicates that the value of MP(k−1) always corresponds to a sample time k−1 immediately prior to the current sample time k.

In response to $\vec{s}_1(k)$, $\vec{s}_2(k)$, $P_1(k)$, $P_2(k)$, and MP(k−1), the states-and-covariances combiner 66 effectively combines the elements of $\vec{s}_1(k)$ and $\vec{s}_2(k)$ in a probabilistic manner to generate a resulting state vector $\vec{s}_{out}(k)$ that represents the position and velocity of the target at sample time k, and combines the elements of the covariance matrices $C_1(k)$ and $C_2(k)$ to generate a resulting covariance matrix $C_{out}(k)$ that represents the error in $\vec{s}_{out}(k)$. For example, if it is more likely that the target is following the flight path modeled by the first filter 60, then the combiner 66 weights the value of $\vec{s}_1(k)$ more heavily than it weights the value of $\vec{s}_2(k)$ in the formation of $\vec{s}_{out}(k)$, and weights the value of the first-filter covariance matrix $C_1(k)$ more heavily than it weights the value of the second-filter covariance matrix $C_2(k)$ in the formation of the resulting covariance matrix $C_{out}(k)$. Conversely, if it is more likely that the target is following the flight path modeled by the second filter 62, then the combiner 66 weights the value of $\vec{s}_2(k)$ more heavily than it weights the value of $\vec{s}_1(k)$ in the formation of $\vec{s}_{out}(k)$, and weights the value of the second-filter covariance matrix $C_2(k)$ more heavily than it weights the value of the first-filter covariance matrix $C_2(k)$ in the formation of the resulting covariance matrix $C_{out}(k)$.

Still referring to FIG. 5, the estimate generator 68 generates the modeled (i.e., estimated) values of $\theta_{AZ\_Estimated}(k)$ and $\theta_{EL\_Estimated}(k)$ and $H_{Range}(k)$ in response to $\vec{s}_{out}(k)$ from the combiner 66 and in response to the coordinates of the aircraft at sample time k from the position determiner 46 (FIG. 4), and generates the modeled values of PRE(k) and $\sigma_{Range}(k)$ in response to the resulting covariance matrix $C_{out}(k)$ from the combiner.

The states-and-covariances modifier 70 modifies $\vec{s}_1(k)$, $\vec{s}_2(k)$, $C_1(k)$, and $C_2(k)$ from the first and second filters 60 and 62 in response to MP(k−1), $P_1(k)$, and $P_2(k)$, and provides the modified state vectors $\vec{s}_1(k-1)$ and $\vec{s}_2(k-1)$, and the modified covariance matrices $C_1(k-1)$ and $C_2(k-1)$, to the first and second filters 60 and 62, respectively. The first filter 60 uses $\vec{s}_1(k-1)$ as the initial state vector $\vec{s}_1(k)$, and $C_1(k-1)$ as the initial covariance matrix $C_1(k)$, at the next sample time k. Likewise, the second filter 62 uses $\vec{s}_2(k-1)$ as the initial state vector $\vec{s}_2(k)$, and $C_1(k-1)$ as the initial second covariance matrix $C_2(k)$, at the next sample time k.

Before describing the operation of the computing apparatus 40 of FIG. 4 according to an embodiment, described are some concepts that the computing apparatus may employ to range a target.

As described above in conjunction with FIGS. 1-3, it is difficult to impossible to determine passively the azimuth range from an aircraft 10 to a target T using only readings of the azimuth angle to the target when both the aircraft and target are traveling at respective constant velocities.

But a technique that overcomes this problem has been discovered. In general, it has been found that if an aircraft maneuvers so as to induce an additional derivative in the aircraft's motion relative to the target aircraft, and so as to cause an azimuth angle to the target to vary over a range that is greater than 180°, then a computing apparatus onboard the aircraft can determine, with sufficient accuracy, the azimuth range of the target within a sufficiently short time window using only azimuth-angle measurements. Inducing an additional derivative of motion means, for example, that if the target is traveling at constant velocity such that the derivative of the target's velocity, which is the target's acceleration, is zero, then the aircraft changes its velocity such that the derivative of the aircraft's velocity, which is the aircraft's acceleration, is nonzero. An embodiment of this technique is described below in conjunction with FIG. 6.

Figure 6:
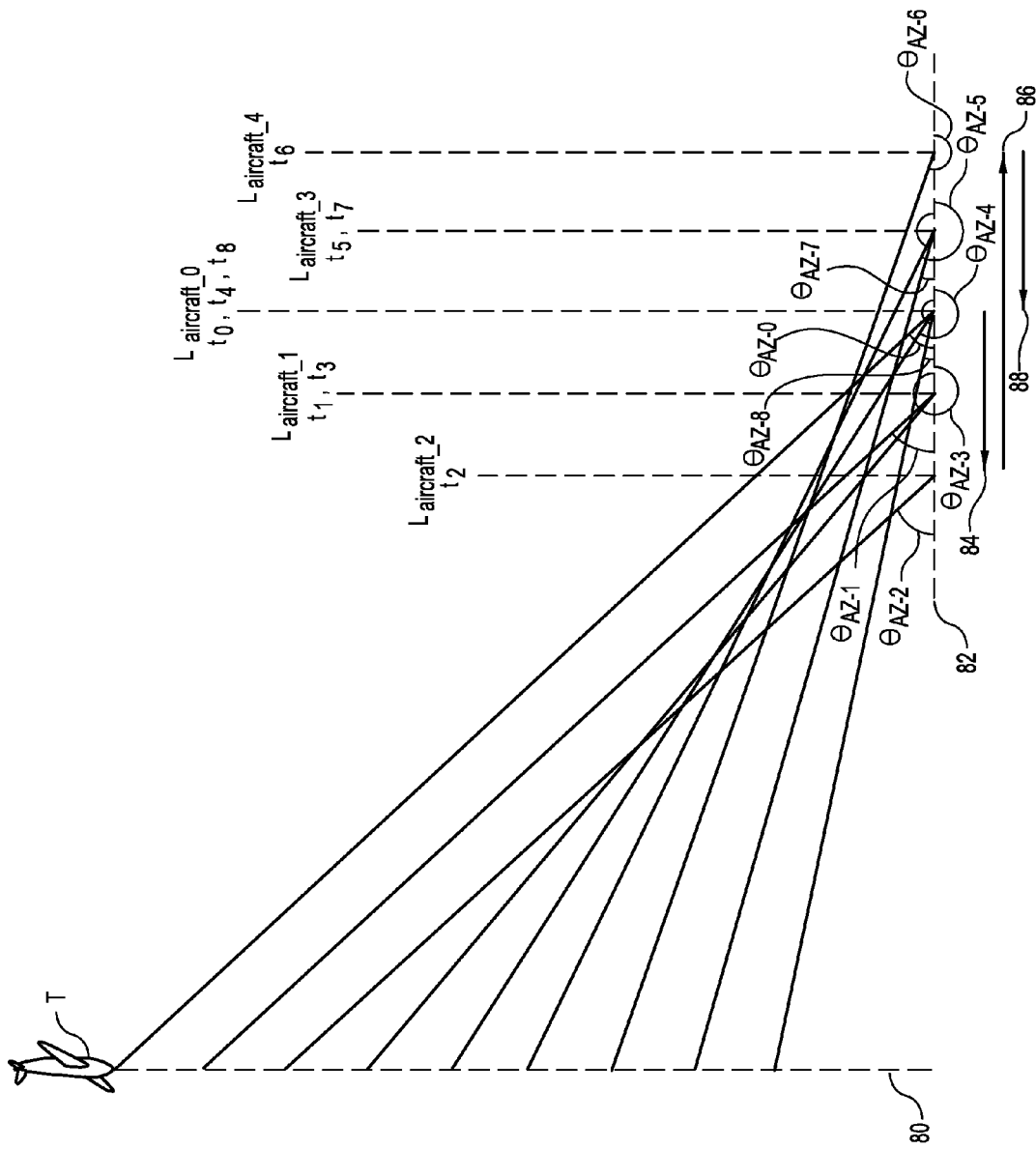
FIG. 6 is a diagram demonstrating a technique for passively ranging a target aircraft according to an embodiment.

FIG. 6 is an overhead view of a target T flying along a straight path 80 at a constant velocity and at a level altitude, and of a path 82 along which an aircraft (not shown in FIG. 6) may theoretically fly back and forth.

At a time $t_0$, the aircraft is in a position $L_{aircraft\_0}$ and is flying along the straight path 80 at a constant velocity, a level altitude, and a heading indicated by the arrow 84, and the azimuth angle from the aircraft to the target T is an acute angle $\theta_{AZ\_0}$.

And at times $t_1$ and $t_2$—in this example, it is assumed that the intervals between successive times t are approximately equal to one another, although this is not required—the aircraft is in respective positions $L_{aircraft\_1}$ and $L_{aircraft\_2}$, and the azimuth angles from the aircraft to the target T are respective acute angles $\theta_{AZ\_1}$ and $\theta_{AZ\_2}$.

But at time $t_2$, the aircraft theoretically makes a hairpin turn, and begins to fly back along the straight path 80 at a constant velocity, a level altitude, and a heading indicated by the arrow 86, which heading is opposite (e.g., 180°) to the heading indicated by the arrow 84; that is, the aircraft theoretically reverses its heading along the same flight path.

Therefore, at times $t_3$-$t_6$, the aircraft is in respective positions $L_{aircraft\_1}$, $L_{aircraft\_0}$, $L_{aircraft\_3}$, and $L_{aircraft\_4}$, and the azimuth angles from the aircraft to the target T are respective angles $\theta_{AZ\_3}$, $\theta_{AZ\_4}$, $\theta_{AZ\_5}$, and $\theta_{AZ\_6}$, which are all more than 180° different from $\theta_{AZ\_0}$, $\theta_{AZ\_1}$, and $\theta_{AZ\_2}$.

But at time $t_6$, the aircraft theoretically makes another hairpin turn, and begins to fly back along the straight path 80 at a constant velocity, a level altitude, and a heading indicated by the arrow 88, which heading is opposite (e.g., 180°) to the heading indicated by the arrow 86 but collinear with the heading indicated by the arrow 84: that is, the aircraft once again theoretically reverses its heading along the same flight path.

Therefore, at times $t_7$ and $t_8$, the aircraft is in respective positions $L_{aircraft\_3}$ and $L_{aircraft\_0}$, and the azimuth angles from the aircraft to the target T are respective angles $\theta_{AZ\_7}$ and $\theta_{AZ\_8}$, which are all more than 180° different from $\theta_{AZ\_3}$, $\theta_{AZ\_4}$, $\theta_{AZ\_5}$, and $\theta_{AZ\_6}$.

It can be demonstrated mathematically that such reversing of direction by the aircraft effectively allows the computing apparatus 40 to triangulate the flight path 80 of the target T independently of the amplitudes of the passive signals from the target (e.g., using only the azimuth angles $\theta_{AZ\_0}$-$\theta_{AZ\_8}$). It can also be demonstrated that this is true even if the flight path 82 of the aircraft has a different azimuth orientation relative to the flight path 80 of the target T than shown in FIG. 6. Ideally, however, this technique may work best when a theoretical line from the target T to a center (e.g., location $L_{aircraft\_0}$) of the reversing flight path 82 of the aircraft makes a right angle with the reversing flight path.

Still referring to FIG. 6, although the aircraft reversing directions along the flight path 82 may allow the first filter 60 of FIG. 5 to eventually converge its model of the target T's flight path to the target's actual flight path 80, this convergence may take so long that there may be insufficient time remaining for the pilot of the aircraft to take appropriate action regarding the target.

While the aircraft is flying straight along the headings 84, 86, and 88, the differences between successive ones of the azimuth angles $\theta_{AZ\_0}$-$\theta_{AZ\_2}$, $\theta_{AZ\_3}$-$\theta_{AZ\_6}$, and $\theta_{AZ\_7}$-$\theta_{AZ\_8}$ (e.g., the difference between the azimuth angles $\theta_{AZ\_1}$-$\theta_{AZ\_2}$) may be relatively small, which may cause the azimuth error (e.g., the difference between the measured azimuth angle $\theta_{AZ\_Raw}(k)$ and the modeled azimuth angle) to also be relatively small. Because effective loop bandwidth of the first filter 60 is relatively low to filter out noise as described above in conjunction with FIG. 5, small azimuth errors may cause the first filter to make only small changes in the target's model flight path; therefore, the smaller the differences between successive ones of the azimuth angles $\theta_{AZ\_0}$-$\theta_{AZ\_8}$, the longer the time that the first filter may need to converge its model flight path to the target's actual flight path.

Consequently, causing the differences between these successive azimuth angles along the non-turn portions of the path 82 to be larger may speed the convergence the model flight path of the first filter 60 to the target's actual flight path, and thus reduce the time that the second stage 54 (FIGS. 4-5) needs to provide a sufficiently accurate value of $H_{Range}(k)$.

One way to increase the differences between these successive azimuth angles along the non-turn portions of the path 82 is to vary the speed of the aircraft, e.g., sinusoidally, as it traverses these non-turn portions of the path.

And another way to increase the differences between these successive azimuth angles is to make the theoretical hairpin turns described above more gradual, e.g., sinusoidal.

As described below in conjunction with FIGS. 7A and 7B, it has been found that maneuvering an aircraft through a sinusoidal, or a quasi-sinusoidal, flight path induces an additional derivative in the aircraft's motion relative to a target, causes an azimuth angle to the target to vary over a range that is greater than 180°, and yields relatively large differences between successive azimuth angles, such that the stage 54 of FIG. 4 can yield estimates of $H_{Range}(k)$ accurate enough and fast enough to allow a pilot sufficient time to take appropriate action regarding the target.

Figure 7A:
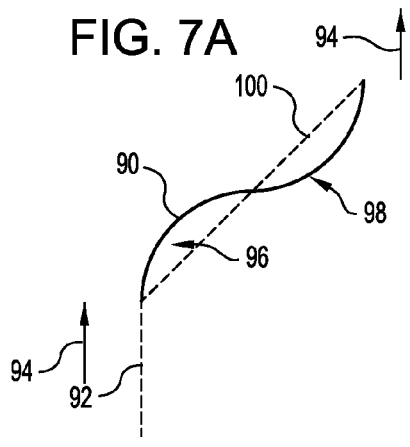
FIGS. 7A and 7B are diagrams of respective example maneuvers that a tactical fighter aircraft may make to allow the apparatus of FIG. 4 to range a target aircraft in a manner that is consistent with the passive-ranging technique described above in conjunction with FIG. 6.
Figure 7B:
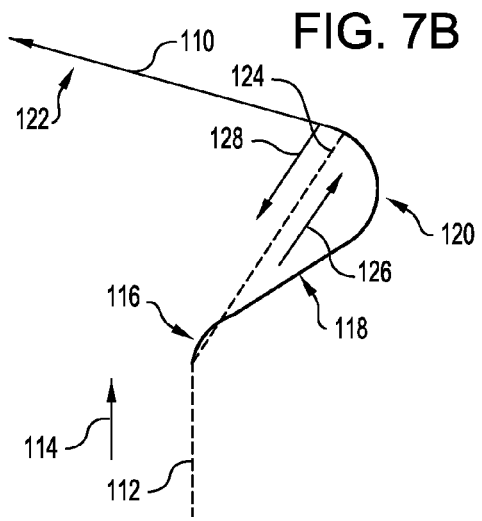

FIGS. 7A and 7B are diagrams of respective flight paths that may approximate the theoretical flight path 82 of FIG. 6 with changes in velocity during the straight portions so as to allow the computing apparatus 40 of FIG. 4 to range a target T to a specified accuracy within a specified time window according to an embodiment of the concepts described above in conjunction with FIG. 6.

FIG. 7A is a diagram of a two-turn flight path 90 according to an embodiment.

Before entering the flight path 90, it is assumed that the aircraft (not shown in FIG. 7A) is flying along a straight, level path 92 at a heading 94.

Next, the pilot causes the aircraft to enter the flight path 90 by maneuvering the aircraft through a sinusoidal right turn 96, and then maneuvering the aircraft through a sinusoidal left turn 98 until the aircraft is back on the heading 94; although not shown, the pilot may continue the left turn 98 until the aircraft is back on its original path 92.

Although the flight path 90 includes curves, a projection 100 of the flight path in a single dimension approximates one leg (e.g., from the left end to the right end) of the reversing, overlapping flight path 82 of FIG. 6, and thus may allow azimuth ranging of a target according to the concepts described above in conjunction with FIG. 6.

The flight path 90 may allow the computing apparatus 40 (FIG. 4) to better range a target than if the aircraft merely turned to follow a straight path along the projection 100 because the flight path 90 is sinusoidal, and thus causes the aircraft's velocity component along the projection 100 to vary even if the aircraft is traveling at a constant speed.

Therefore, even though the flight path 90 does not reverse itself along the projection 100, it can be shown mathematically that the changes in velocity induced by the flight path may allow the computing apparatus 40 (FIG. 4) to determine the flight path of the target according to the concepts described above in conjunction with FIG. 6.

Furthermore, the time window needed by the computing apparatus 40 to range the target within a specified range of accuracy when an aircraft follows the path 90 may depend on the orientation of the projection 100 to the target (not shown in FIG. 7A).

Moreover, the ranging time window may depend on the spatial frequency (i.e., "tightness") of the turns 96 and 98. It has been found that the more gradual the turns, typically the shorter the time window, because the velocity of the aircraft is changing over a longer time period. In contrast, the tighter the turns, typically the longer the time window, because the velocity of the aircraft is changing over a shorter time period. For example, the reversing hairpin turns described above in conjunction with FIG. 6 are, theoretically, turns with infinite tightness, in which case there is only one sudden velocity change caused by each reversal of direction. Therefore, although ranging a target is theoretically possible using such theoretical infinitely tight turns, the ranging time window is significantly shorter if these theoretical sudden turns are, in actuality, made more gradual, e.g., like the turns 96 and 98, so that the changes between consecutive measured azimuth angles are significantly larger than the noise floor, and are otherwise large enough to cause an azimuth error large enough for the Kalman filters 60 and 62 to use for updating their target-flight-path models.

The tightness of the turns 96 and 98 may depend on a number of factors such as the speed of the aircraft, the number of G's the pilot wants/can pull, and the pilot's experience (either actual or simulated) as to what type of turns best speed ranging convergence in a given target-ranging situation.

FIG. 7B is a diagram of a two-turn-with-straight-leg-between-the-turns flight path 110 according to an embodiment.

Before entering the flight path 110, it is assumed that the aircraft (not shown in FIG. 7B) is flying along a straight, level path 112 at a heading 114. Next, the pilot causes the aircraft to enter the flight path 110 by maneuvering the aircraft through a sinusoidal right turn 116 to a straight leg 118, and then maneuvering the aircraft from the straight leg through a sinusoidal left turn 120 to another straight leg 122. While on the straight legs 118 and 122, the aircraft is traveling at a constant velocity according to an embodiment, although the aircraft may vary its speed along these straight legs. Furthermore, although not shown, the pilot may maneuver the aircraft from the straight leg 122 through another sinusoidal right turn until the aircraft is back on the heading 114, or back on the path 112 too.

A single-dimension projection 124 of the flight path 110 approximates two legs (e.g., from the left end to the right end and overlapping back toward the center) of the reversing, overlapping flight path 82 of FIG. 6; therefore, the flight path 110 may allow azimuth ranging of a target according to the concepts described above in conjunction with FIG. 6.

The flight path 110 may allow better ranging than the flight path 90 of FIG. 6 because in addition to inducing velocity changes along the projection 124, the fight path 110 also induces a direction reversal (indicated by the arrows 126 and 128) along the projection.

Furthermore, the ranging effectiveness of the path 110 may depend on the orientation of the projection 124 to the target (not shown in FIG. 7B), the tightness of the turns 116 and 120, and the lengths of the straight legs 118 and 122.

Referring to FIGS. 7A and 7B, other embodiments of flight paths with turns are contemplated. For example, a flight path may have only a single turn, or more than two turns. Furthermore, the single-dimension projections may be oriented other than from the beginning of the first curve to the end of the last curve. In yet another embodiment, the aircraft may change its speed (e.g., sinusoidally) but stay on its original straight, level flight path.

Figure 8:
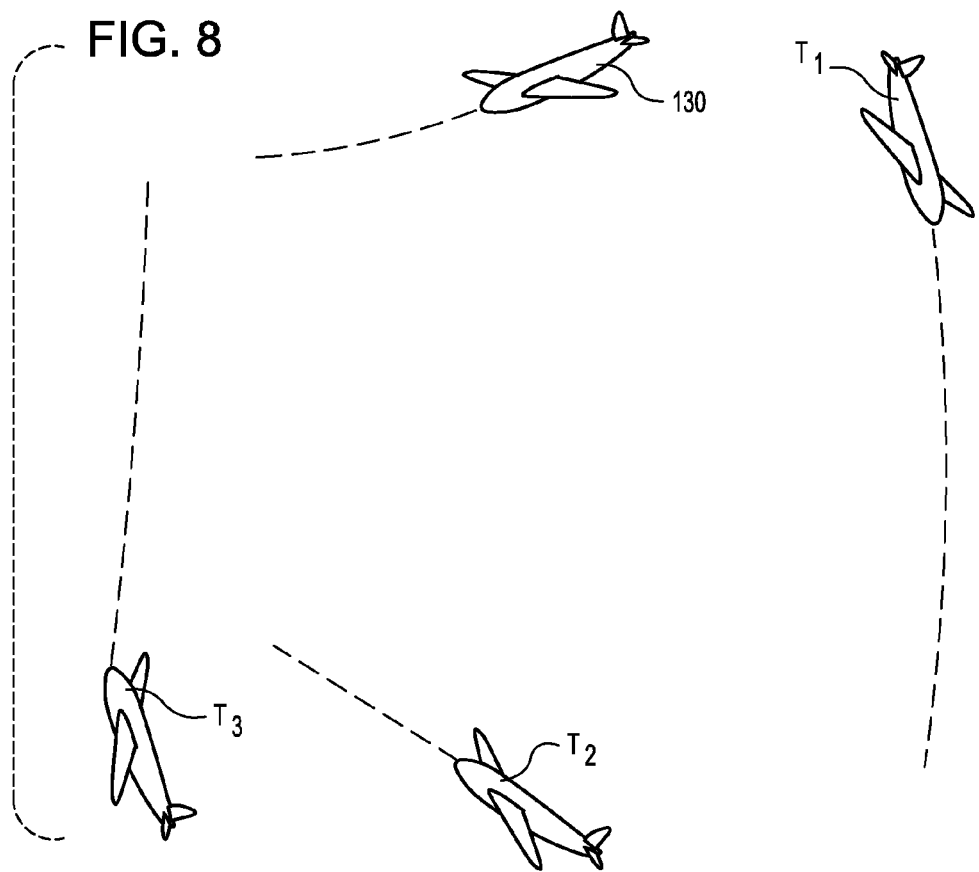
FIG. 8 is an overhead view of a tactical fighter aircraft and of multiple target aircraft, and demonstrates a technique for distinguishing between the target aircraft, according to an embodiment.

FIG. 8 is an overhead view of multiple targets, here three targets $T_1$-$T_3$, and an aircraft 130 that incorporates the computing apparatus 40 of FIG. 4, which is configured to distinguish and track each of the three targets according to an embodiment. That is, the computing apparatus 40 is configured to generate respective values for $\theta_{AZ\_Estimated}(k)$, $\theta_{EL\_Estimate}(k)$, $H_{Range}(k)$, PRE(k), and $\sigma_{Range}(k)$ for each target of the multiple targets $T_1$-$T_3$, and the pilot (not shown in FIG. 8) can view all this information so that he/she can take appropriate action for each of these targets.

The computing apparatus 40 (FIG. 4) distinguishes the targets $T_1$-$T_3$ from one another so that it does not "confuse" the passive signals from one target with the passive signals from another target; such confusion could result in incorrect tracking of one or more of the targets, or even could result in the failure to recognize the existence of one or more of the targets.

The computing apparatus 40 may be configured to distinguish the targets $T_1$-$T_3$ from one another based on the respective elevation angle $\theta_{EL\_Estimated}(k)$ of each target relative to the aircraft 130, or based on the altitude of each target.

Or, the computing apparatus 40 may be configured to distinguish the targets $T_1$-$T_3$ based on the respective pulse descriptor word (PDW) that each target transmits as part of the signals passively received by the aircraft 130—the PDW is, e.g., a digital value unique to the target transmitting it.

Or, the computing apparatus 40 may be configured to distinguish the targets $T_1$-$T_3$ from one another based on the respective azimuth angle $\theta_{AZ\_Estimated}(k)$ or azimuth range $H_{Range}(k)$ of each target.

Still referring to FIG. 8, alternate embodiments for distinguishing and tracking multiple targets are contemplated. For example, the computing apparatus 40 may be configured to simultaneously use two or more of the above-described techniques to distinguish the targets $T_1$-$T_3$ from one another. Furthermore, the computing apparatus 40 may be configured to use one or more other conventional techniques to distinguishing the targets $T_1$-$T_3$ from one another. Moreover, the computing apparatus may be configured to distinguish fewer or more than three targets.

Figure 9:
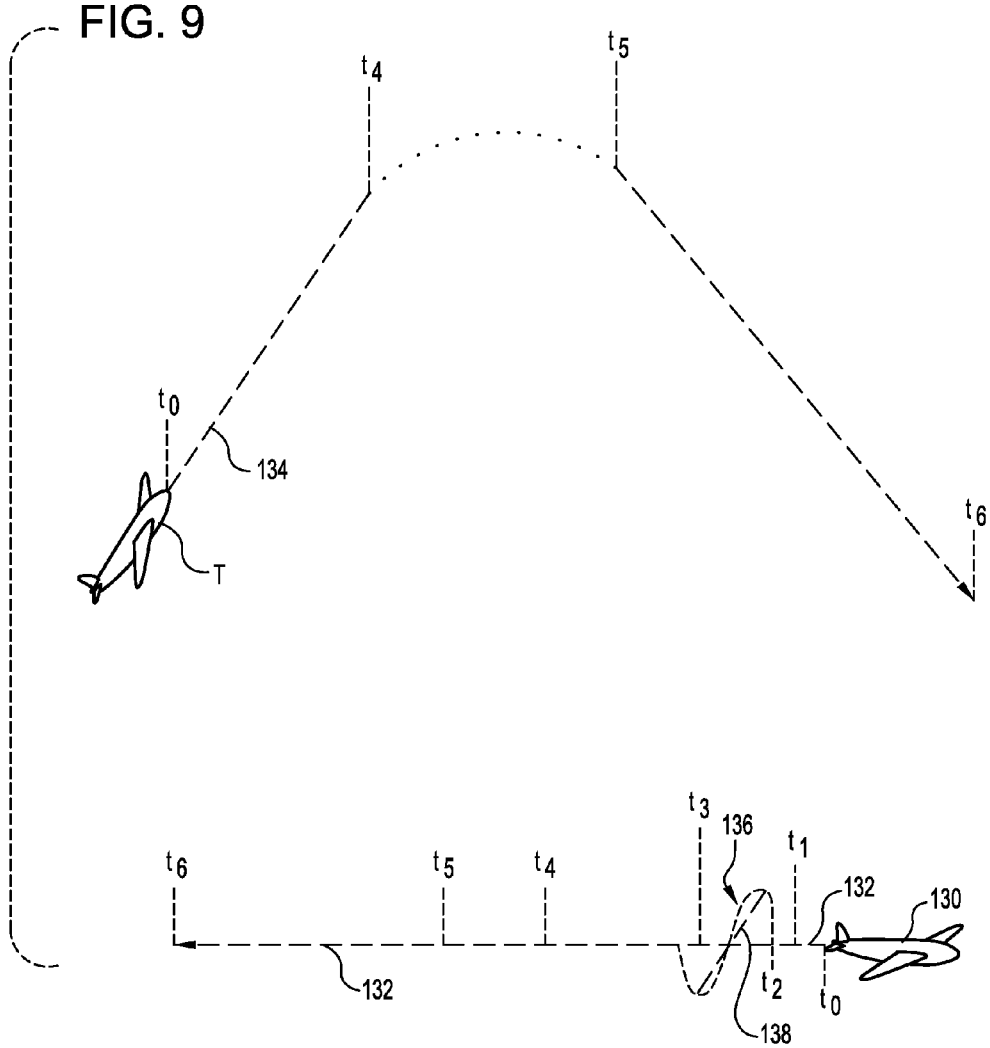
FIG. 9 is an overhead view of a tactical fighter aircraft that includes the apparatus of FIG. 4 and of a target aircraft, and demonstrates a technique that the apparatus of FIG. 4 may use for ranging the target aircraft, according to an embodiment.

FIG. 9 is an overhead view of the aircraft 130 and of a target aircraft T according to an embodiment.

The operation of the computing apparatus 40 of FIG. 4 is described now in conjunction with FIGS. 4-9 according to an embodiment. In this example, the computing apparatus 40 is configured to provide a value for $H_{Range}(k)$ having a first specified value for PRE(k) (e.g., 15%) within a first specified time window (e.g., 20 seconds), and to provide a value for $H_{Range}(k)$ having a second specified value for PRE(k) (e.g., 5%) within a second specified time window (e.g., 10 seconds after the end of the first time window). But if the target T maneuvers within one of these time windows, then the current time window may be suspended until the target comes out of the maneuver.

Referring to FIG. 9, at a time $t_0$, the aircraft 130 is flying along a straight path 132 at a first constant velocity and at a first level altitude, and the target T is flying along a straight path 134 at a second constant velocity and at a second level altitude.

At a time $t_1$, the EWS 42 (FIG. 4) detects a signal emanating from the target T, conventionally confirms that the target T is a target that the EWS should track, and generates values for at least $\theta_{AZ\_RAW}(k)$ and $\theta_{EL\_RAW}(k)$. The EWS 42 continues to update the values for at least $\theta_{AZ\_RAW}(k)$ and $\theta_{EL\_RAW}(k)$ at each sample time k, i.e., each time that the EWS receives a signal from the target T (e.g., nominally between about 2 times to 10 times per second (2 Hz-10 Hz).

In response to the first value for $\theta_{AZ\_RAW}(k)$, the turn determiner 56 (FIG. 4) prompts the pilot, e.g., via a display (not shown in FIGS. 4-9), to maneuver the aircraft 130 from the straight flight path 132 through a two-turn (or more-than-two-turn) flight path 136 such that a single-dimension projection 138 of this two-turn flight path is approximately perpendicular to, and approximately centered about, the target T (i.e., is approximately perpendicular to a straight line drawn from the target to the center of the single-dimension projection).

Alternatively, the turn determiner 56 may automatically maneuver the aircraft 130 from the straight flight path 132 through the two-turn flight-path 136 via, e.g., a conventional auto-pilot system (not shown in FIGS. 4-9) onboard the aircraft 130.

In still yet another alternative, the turn determiner 56 may not prompt the pilot to maneuver the aircraft 130, and may not automatically maneuver the aircraft, until the second stage 54 of the range finder 44 receives and loads the seed values from the first stage 52 of the range finder.

Also in response to the first value for $\theta_{AZ\_RAW}(k)$ and the current coordinates and velocity of the aircraft 130 from the position determiner 46 (FIG. 4), each Kalman filter in the first stage 52 of the range finder 44 begins to track the target T for a specified period of time (e.g., 10 seconds).

At a time $t_2$, the pilot begins to maneuver the aircraft 130 through the flight path 136 to help speed the convergence of at least one of the Kalman filters in the first stage 52.

At a time $t_3$, the first-stage Kalman filter yielding the smallest residuals between the values of $\theta_{AZ\_RAW}(k)$ from the EWS 42 and the azimuth angles estimated by this Kalman filter provides the most recent values of its filter parameters (e.g., state vector $\vec{s}(k)$, covariance matrix $C(k)$, filter coefficients) to the second stage 54 as parameter seed values. Although the time $t_3$ is shown in FIG. 9 as occurring while the pilot is maneuvering the aircraft 130 through the turn flight path 136, $t_3$ may instead occur before the pilot starts maneuvering the aircraft, or after the pilot completes the maneuver.

At, or shortly after, the time $t_3$, the first and second Kalman filters 60 and 62 of the second stage 54 of the range finder 44 load the seed values from the first stage 52 and begin to track the target T in response to at least the values of $\theta_{AZ\_RAW}(k)$ from the EWS 42 and the coordinates and velocity components of the aircraft 130 from the position determiner 46.

During the interval between approximately $t_3$ and $t_4$, because the target T is flying straight, at a constant velocity, and at a level altitude, the first filter 60 tracks the target more accurately than the second filter 62, because, as discussed above, the first filter models the target's flight path as being straight, level, and constant velocity, and the second filter models the target as turning; therefore, the states-and-covariances combiner 66 weights $\vec{s}_1(k)$ and $C_1(k)$ more heavily than it weights $\vec{s}_2(k)$ and $C_2(k)$ in its calculation of $\vec{s}_{out}(k)$ and $C_{out}(k)$.

But during the interval between $t_4$ and $t_5$, because the target T is maneuvering (e.g., turning), the second filter 62 tracks the target more accurately than the first filter 60; therefore, the states-and-covariances combiner 66 weights $\vec{s}_2(k)$ and $C_2(k)$ more heavily than it weights $\vec{s}_1(k)$ and $C_1(k)$ in its calculation of $\vec{s}_{out}(k)$ and $C_{out}(k)$.

Then, during the interval between $t_5$ and $t_6$, because the target T resumes flying straight, at a constant velocity, and at a level altitude, the first filter 60 again tracks the target T more accurately than the second filter 62; therefore, the states-and-covariances combiner 66 again weights $\vec{s}_1(k)$ and $C_1(k)$ more heavily than it weights $\vec{s}_2(k)$ and $C_2(k)$ in the generation of $\vec{s}_{out}(k)$ and $C_{out}(k)$.

At two points (not shown in FIG. 9) between $t_3$ and $t_6$, the range finder 44 meets the above-described criterion for providing specified values of $H_{Range}(k)$ having specified ranges of PRE(k) within specified time windows. The exact locations of the two points between $t_3$ and $t_6$ depends on the time lapse between $t_3$ and $t_6$. If one of these windows occurs between times $t_4$ and $t_5$, then the range finder 44 suspends the window until after the maneuver is complete at time $t_6$; there may be some latency between when the maneuver is started/completed and when the range finder 44 detects that the maneuver is started/completed The first and second Kalman filters 60 and 62 continue operating in the above-described manner until the target T is out of a danger range relative to the aircraft 130, the pilot destroys the target, or the pilot indicates that he/she wishes the computing apparatus to track the target no longer.

While the states-and-covariances combiner 66 is generating $\vec{s}_{out}(k)$ and $C_{out}(k)$, the estimate generator 68 is generating values for $\theta_{AZ\_Estimated}(k)$, $\theta_{EL\_Estimated}(k)$, $H_{Range}(k)$, PRE(k), and $\sigma_{Range}(k)$, and a display (not shown in FIGS. 4-9) is displaying one or more of these values to the pilot.

In an embodiment, the pilot can determine the azimuth range within approximately 99% accuracy by mentally computing the azimuth range equal to $H_{RANGE}(k) \pm /m \cdot \sigma_{Range}(k)$, where "m" is an arbitrary factor whose value depends, e.g., on the design of the computing apparatus 40. For example, m=3 in an embodiment.

Furthermore, the first and second Kalman filters 60 and 62 may provide sufficiently accurate values for $\vec{s}_{out}(k)$ and $C_{out}(k)$ even if the EWS 42 introduces angle bias (i.e., a non-random bias error) into $\theta_{AZ\_RAW}(k)$ and/or $\theta_{EL\_RAW}(k)$.

Still referring to FIGS. 4-9, alternate embodiments of the computing apparatus 40 are contemplated. For example, the turn determiner 56 may be configured to instruct the pilot to maneuver the aircraft into the turn flight path 136 at a different relative time, such as after the second stage 54 receives the seed values from the first stage 52 and begins tracking the target T. Or, the turn determiner 56 may be configured to instruct the pilot to maneuver the aircraft 130 into multiple turned flight paths that are separated by straight flight paths, for example, to speed the convergence of the second stage 54 to an accurate model of the target T's flight path. Furthermore, although shown as returning the aircraft 130 to the original flight path 132 after the turn flight path 136, the pilot may return the aircraft to another flight path.

Although concepts related to the ranging of an airborne target from an aircraft, such as a tactical fighter aircraft (TFA), are described above in conjunction with FIGS. 1-9, it is sometimes desirable that a pilot also be able to range passively a ground-based target from an aircraft to a desired accuracy within a specified time window and, e.g., independently of the amplitudes of the passive signals received from the target.

Therefore, an embodiment of a technique for ranging a ground-based target from an airborne object such as an aircraft is described below in conjunction with FIGS. 10-13.

Figure 10:
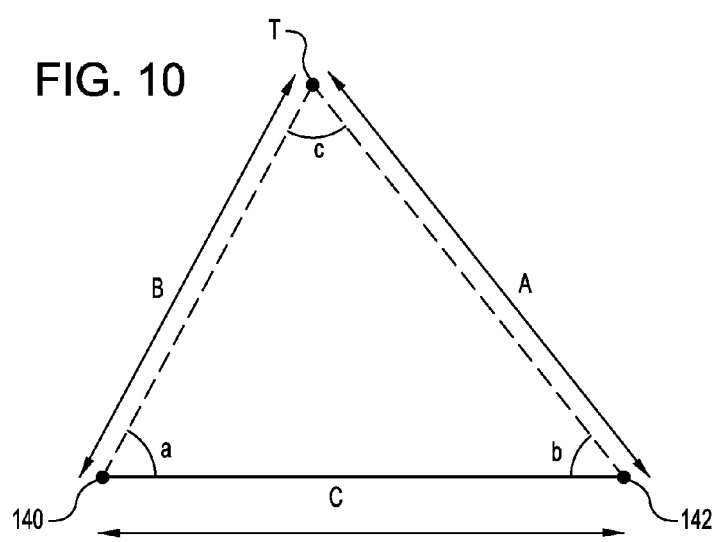
FIG. 10 is a diagram that demonstrates a conventional triangulation of a stationary target.

FIG. 10 is an overhead view of a stationary, ground-based target T, and demonstrates triangulation of the target in an azimuth plane according to an embodiment.

First, from a point 140 of known coordinates, one measures an angle a to the target T.

Next, from a point 142 of known coordinates, one measures an angle b to the target T, and he/she also measures the straight-line distance C between the points 140 and 142.

According to the law of sines:

$$\frac{\operatorname{Sin}(a)}{A} = \frac{\operatorname{Sin}(b)}{B} = \frac{\operatorname{Sin}(c)}{C} \quad (1)$$

and according to the law of triangles:

$$a+b+c=180°. \quad (2)$$

Therefore, from the measured values of the angles a and b, one can determine the angle c from equation (2), and from the angles a, b, c, and the distance C, one can determine the distances A and B, and thus can determine the coordinates of the target T (because the target is ground based, its z coordinate is known, so only its x and y coordinates, which locate the target in the azimuth plane, need be determined).

A technique that allows an aircraft to determine the azimuth range of a ground-based target by effectively triangulating the location of the target in an azimuth plane has been developed. In general, it has been found that if an aircraft maneuvers so as to induce an additional derivative in the aircraft's motion relative to the ground-based target, and to cause an azimuth angle to the target to vary over a range that is greater than 180°, then a computing apparatus onboard the aircraft can determine, with sufficient accuracy, the azimuth range of the target within a sufficiently short time window using only azimuth-angle measurements. Inducing an additional derivative of motion means, for example, that if the target is stationary such that the derivative of the target's position, which is the target's velocity, is zero, then the aircraft changes its position such that the derivative of the aircraft's position, which is the aircraft's velocity, is nonzero. An embodiment of this technique is described below in conjunction with FIG. 11.

Figure 11:
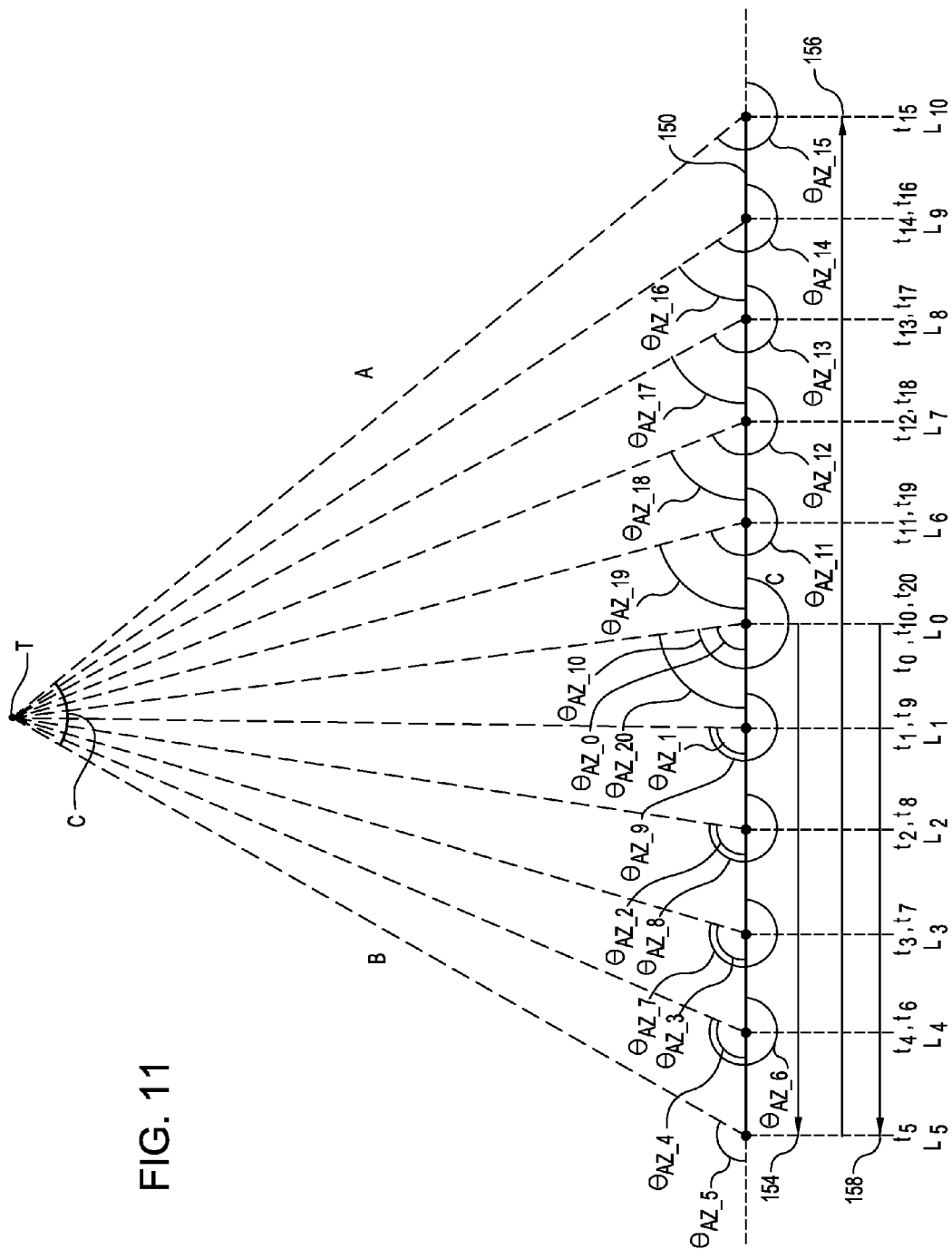
FIG. 11 is a diagram that demonstrates a technique for ranging a ground-based target from a tactical fighter aircraft according to an embodiment.

FIG. 11 is an overhead view of a ground-based target T, and of a path 150 along which an aircraft (not shown in FIG. 11) may theoretically fly. Because the ground-based target T typically travels at a velocity (e.g., 35 nautical miles per hour) that is at least one order of magnitude lower than the velocity (e.g., 400-560 nautical miles per hour) of the aircraft, it has been found that a computing apparatus can be configured to assume that the target is stationary for purposes of this ranging technique.

At a time $t_0$, the aircraft is in a position $L_0$ and is flying along the path 150 at a constant velocity and at a level altitude at a heading indicated by the arrow 154, and the azimuth angle from the aircraft to the target T is an angle $\theta_{AZ\_0}$.

And at times $t_1$-$t_5$, the aircraft is in respective positions $L_1$-$L_5$, and the azimuth angles from the aircraft to the target T are respective angles $\theta_{AZ\_1}$-$\theta_{AZ\_5}$.

But at time $t_5$, the aircraft theoretically makes a hairpin turn, and begins to fly back along the path 150 at a constant velocity and at a level altitude at a heading indicated by the arrow 156, which heading is opposite (e.g., 180°) to the heading indicated by the arrow 154.

Therefore, at times $t_6$-$t_{10}$, the aircraft is in respective positions $L_4$-$L_0$, and the azimuth angles from the aircraft to the target T are the respective angles $\theta_{AZ\_6}$-$\theta_{AZ\_10}$, which, at least theoretically, are all 180° different from $\theta_{AZ\_4}$-$\theta_{AZ\_0}$, respectively. Furthermore, at times $t_{11}$-$t_{15}$, the aircraft is in respective positions $L_6$-$L_{10}$, and the azimuth angles from the aircraft to the target T are respective angles $\theta_{AZ\_11}$-$\theta_{AZ\_15}$.

But at time $t_{15}$, the aircraft theoretically makes another hairpin turn, and begins to fly back along the path 150 at a constant velocity and at a level altitude at a heading indicated by the arrow 158, which heading is opposite (e.g.,) 180° to the heading indicated by the arrow 156 but is collinear with the heading indicated by the arrow 154.

Therefore, at times $t_{16}$-$t_{20}$, the aircraft is in respective positions $L_9$, $L_8$, $L_7$, $L_6$, and $L_0$, and the azimuth angles from the aircraft to the target T are respective angles $\theta_{AZ\_16}$-$\theta_{AZ\_20}$, which are each 180° different from $\theta_{AZ\_14}$-$\theta_{AZ\_10}$, respectively.

Therefore, the aircraft has effectively created a number of triangles from which an onboard computing apparatus may, via triangulation, determine the azimuth coordinates of, and thus the azimuth range to, the target T—for the angles $\theta_{AZ\_6}\theta_{AZ\_15}$, the computing apparatus may form triangles including T as a vertex by adding or subtraction 180° from each of these angles. Furthermore, it has been determined that error added to the calculated azimuth coordinates and range of the target T due to movement of the target is negligible, particularly if the magnitude of the target's velocity is one order or magnitude or more below the magnitude of the aircraft's velocity.

Although, technically, only one such triangle is needed to compute the azimuth coordinates, and thus the azimuth range, of the target T, the computing apparatus may effectively average the results from multiple triangles to filter, e.g., noise, from the result. Generally, in more detail, a pilot sets out on a mission to reach a location in a specified amount of time into the mission. As the pilot flies toward the target, he rarely remains at a constant-speed and constant-heading flight path for more than a few minutes because varying his orientation helps mitigate being easily targeted because his flight path would be more predictable. Rather, then, the pilot initiates irregular heading changes, and these changes in heading, which the pilot is making anyway, can help aid in passive range estimation to surface-emitting targets (be they stationary or slow moving) because the "triangles" created can offer greater traversed-bearing-spread (TBS), which directly relates to a reduction in percent range error (PRE) (i.e., improved convergence rate). There may be many emitters/targets all around the aircraft as it ingresses and egresses enemy territory, and there will typically be some emitters/targets for which the aircraft-to-emitter geometries are near optimal such that ranging performance will be good as the aircraft flies its course. But there may be other surface emitters/targets that are near the nose of the aircraft and, therefore, that may not be amenable to good range-estimation convergence because the time to TBS is too long, and the aircraft will be flying almost "over" the emitter/target unprepared. So the additional occasional irregular aircraft heading changes provide an opportunity for the near-nose targets to be "ranged" as the "triangles" favoring them are created. And, then, with the undoing of the heading change, the pilot can resume in the direction desired to reach his bogey location in a timely manner—all part of the flight-path management function. By having the surface emitter/target locations known, even if they are not real concerns to the pilot, these data may be immediately transmitted to other "friendly" aircraft via any number of ways, like audibly or via the IFDL (intra-flight data link) that intraconnects the friendly aircraft. And the same surface-emitter/target locations are used for egressing enemy territory as well—because over a period of an hour or two, the surface emitters/targets in many cases don't move—and those that are mobile, their distances traveled isn't huge given the nature of the terrain they are traveling in many cases.

Moreover, changing the velocity of the aircraft, e.g., sinusoidally, as it travels back and forth along the path 150 may speed the computing apparatus's convergence to the range of the target (and possible to other values) having a specified accuracy within a specified time window as described above in conjunction with FIGS. 6-7B.

Still referring to FIG. 11, it may be impractical to impossible for a pilot to maneuver an aircraft, such as the tactical fighter aircraft 130 of FIGS. 8-9, through the theoretical reversing, overlapping flight path 150.

But a pilot may maneuver an aircraft through a sinusoidal, or a quasi-sinusoidal, flight path that, for purposes of ranging the ground-based target T per the above-described concepts, approximates the reversing, overlapping flight path 150; for example, the two-turn flight paths 90 and 110 of FIGS. 7A and 7B may be suitable for triangulation of a ground-based target in an azimuth plane within a specified accuracy and time window for reasons similar to those described for an airborne target in conjunction with FIGS. 6-7B.

Figure 12:
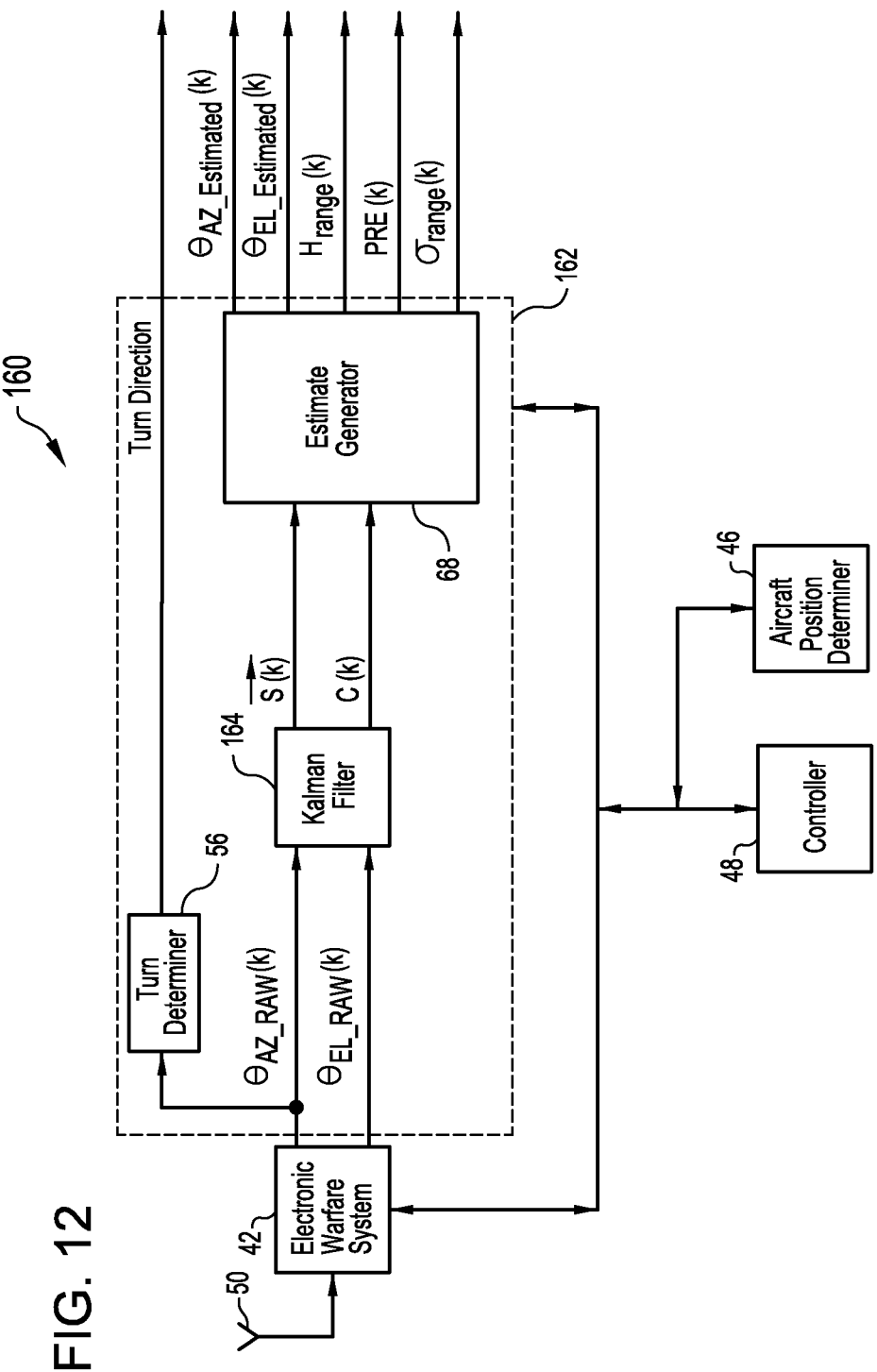
FIG. 12 is a diagram of an apparatus that is configured to implement the ranging technique demonstrated in FIG. 11 according to an embodiment.

FIG. 12 is a diagram of a computing apparatus 160 according to an embodiment, where like numbers reference components common to the computing apparatus 40 of FIGS. 4 and 5. The computing apparatus 160 is configured to determine and to update the azimuth range between an aircraft and one or more ground-based targets (e.g., the target T of FIG. 11) within a time window sufficient to allow a pilot to take appropriate action regarding the target(s), and, e.g., independently of the amplitudes of the passive target signals. Furthermore, the computing apparatus 160 may be located on board the aircraft or in any other suitable location.

In summary, an embodiment of the computing apparatus 160 is configured to accomplish these tasks by "doing" at least one of the following:

(1) "assuming" that the one or more ground-based targets are each stationary; and (2) prompting the aircraft pilot to maneuver the aircraft in a manner that allows the computing apparatus to determine a sufficiently accurate azimuth range independently of the amplitudes of the passive signals received from the one or more targets and within a time window that leaves the pilot enough time to take appropriate action regarding each target.

Still referring to FIG. 12, in addition to the EWS 42, aircraft-position determiner 46, and controller 48, the computing apparatus 160 includes a range finder 162, which includes the turn determiner 56, a Kalman filter 164, and the estimate generator 68.

The EWS 42, position determiner 46, and controller 48 may be configured similarly to these same respect components as described above in conjunction with FIGS. 4-9.

The range finder 162 is configured to be controlled by the controller 48, and is configured to receive at least $\theta_{AZ\_Raw}(k)$ and $\theta_{EL\_Raw}(k)$ from the EWS 42, to receive at least the coordinates and component velocities (e.g., coordinates x, y, and z and component velocities $\dot{x}$, $\dot{y}$, and $\dot{z}$) of the aircraft from the position determiner 46, and to provide estimates $\theta_{AZ\_Estimated}(k)$, $\theta_{EL\_Estimated}(k\_)$, $H_{Range}(k)$, the percentage range error PRE(k) in $H_{Range}(k)$, and the standard deviation $\sigma_{Range}(k)$ in $H_{Range}(k)$ to the pilot of the aircraft (the filter may also provide, e.g., a slant range, and the PRE and the standard deviation a in the slant range). The estimates $\theta_{AZ\_Estimated}(k)$ and $\theta_{EL\_Estimated}(k)$ may be more accurate than $\theta_{AZ\_Raw}(k)$ and $\theta_{EL\_Raw}(k)$, which the EWS 42 provides, because $\theta_{AZ\_Estimated}(k)$ and $\theta_{EL\_Estimated}(k)$ may have reduced levels of noise and other errors due to the filtering action of the range finder 162 (this may also be true for any other estimates of EWS measurements that the filter provides). Furthermore, one or more of the estimates output by the range finder 162 may be smoothed by a filter such as described in U.S. patent application Ser. No. 12/498,310, filed 6 Jul. 2009, titled QUANTITY SMOOTHER, and which is incorporate by reference, before providing these estimates to, e.g., a display, for viewing by the pilot.

The Kalman filter 164 of the range finder 162 may be the same as, or similar to, the first Kalman filter 60 of FIG. 5, in that the filter 164 may model the ground-based target as traveling along a straight path at a constant velocity and at a level altitude.

But differently from the first Kalman filter 60 of FIG. 5, the Kalman filter 164 may be configured to model the ground-based target as having a velocity of zero (e.g., the target component velocities $\dot{x}=\dot{y}=\dot{z}=0$) and as having an altitude equal to the ground altitude (e.g., in units above sea level) in the geographical area in which the target is located. Alternatively, the Kalman filter 164 may be a three-state filter that tracks only the target coordinates x, y, and z, or may be a two-state filter that tracks only the target coordinates x and y (because z is assumed to be constant, or is at least assumed to be known based on x and y and a topological map of the terrain in which the target is located). Furthermore, if the EWS 42 is configured to range the one or more targets, then it may provide one or more seed values (e.g., an initial value for the azimuth range $H_{Range}(k)$ and an initial value for $\sigma_{Range}(k)$, the latter of which may be used to generate initial values for the elements of the Kalman covariance matrix) to the Kalman filter 164—although the EWS may be configured to range the one or more targets, it is typically unable to do so with a sufficient accuracy and within a time window short enough to allow a pilot to take appropriate action regarding the one or more targets. For example, because the target is ground based, z is known, at least approximately, such that a coarse initial value for the azimuth range $H_{Range}(k)$ may be determined trigonometrically in accordance with a right triangle that includes the elevation (e.g., dip) angle $\theta_{EL\_Raw}(k)$ and a base leg opposite the elevation angle and having a length approximately equal to the vertical distance between the target and the aircraft's azimuth plane. Alternatively, another module may be configured to seed the Kalman filter 164 with, e.g., initial values for $H_{Range}(k)$ and $\sigma_{Range}(k)$; an example of such a module and ranging technique is disclosed in U.S. patent application Ser. No. 12/751,875, filed 31 Mar. 2010, titled DETERMINING AT LEAST ONE COORDINATE OF AN OBJECT USING INTERSECTING SURFACES, which is incorporated by reference.

Because there is only one filter 164, and because this one filter is configured to model the target as having zero velocity, the Kalman filter 164 may have no need to generate, and, therefore, may be configured to not generate, Prob_1, or $P_1(k)$ of FIG. 5, and may be configured to generate the state vector $\vec{s}(k)$ having only two (x and y) or three (x, y, and z) possibly non-zero elements, per above, and may be configured to generate C(k) with fewer elements than $C_1(k)$ of FIG. 5 in response to $\vec{s}(k)$ having only two or three possibly non-zero elements.

The Kalman filter 164 may be configured to update $\vec{s}(k)$ and C(k) once each sample time k; for example, the filter may be configured to update $\vec{s}(k)$ by effectively averaging the resulting values of $\vec{s}(k)$ with the resulting values of $\vec{s}$ from all previous sample times k.

The estimate generator 68 is configured to generate values for $\theta_{AZ\_Estimated}(k)$, $\theta_{EL\_Estimated}(k)$, $H_{Range}(k)$, PRE(k), and $\sigma_{Range}(k)$ in response to $\vec{s}(k)$ and C(k) from the Kalman filter 164.

And the turn determiner 56 is configured to determine, in response to the initial value of the azimuth angle $\theta_{AZ\_Raw}(k)$, a turn direction that the pilot of the aircraft can make to speed convergence of the range finder 162 to sufficiently accurate values for $\theta_{AZ\_Estimated}(k)$, $\theta_{EL\_Estimated}(k)$, $H_{Range}(k)$, PRE(k), and $\sigma_{Range}(k)$. Determining the turn direction is discussed further below in conjunction with FIGS. 13 and 14.

The EWS 42, range finder 162, position determiner 46, controller 48, and other components of the computing apparatus 160 may be implemented in hardware, software, firmware, or a combination of two or more of hardware, software, and firmware. For example, one or more of the EWS 42, range finder 162, and position determine 46 may be implemented by software that the controller 48 executes, or may be formed by respective electronic circuits controlled by the controller.

Still referring to FIG. 12, alternate embodiments of the computing apparatus 160 are contemplated. For example, the filter 164 may be configured to implement an algorithm other than a Kalman-filter algorithm.

Figure 13:
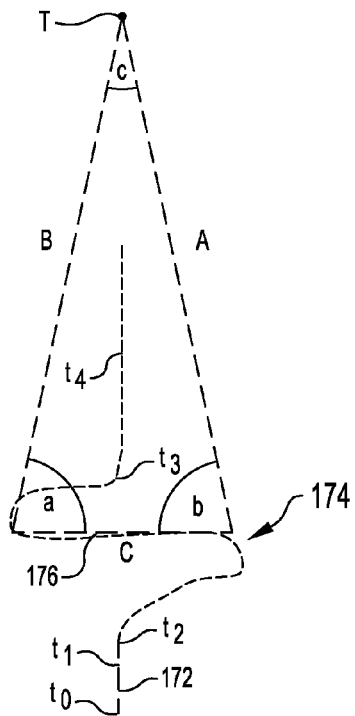
FIG. 13 is an overhead view of a tactical fighter aircraft that includes the apparatus of FIG. 12 and of a ground-based target, and demonstrates a technique that the apparatus of FIG. 12 is configured to use for ranging the target, according to an embodiment.

FIG. 13 is an overhead view of the aircraft 130 and of a ground-based target T according to an embodiment.

The operation of the computing apparatus 160 of FIG. 12 is described now in conjunction with FIGS. 10-13 according to an embodiment. In this example, the computing apparatus 160 is configured to provide a value for $H_{Range}(k)$ having a first specified PRE(k) (e.g., 15%) within a first specified time window (e.g., 20 seconds), and to provide a value for $H_{Range}(k)$ having a second specified PRE(k) (e.g., 5%) within a second specified time window (e.g., 10 seconds after the end of the first time window), where these time windows are deemed sufficient to allow a pilot to take appropriate action regarding a detected target. It is understood that for multiple targets, the computing apparatus 160 may perform a respective instance of the below-described operation for each target.

Referring to FIG. 13, at a time $t_0$, the aircraft 130 is flying along a straight path 172 at a constant velocity and at a level altitude, and the target T is moving at a velocity having a magnitude that is no more than about one order of magnitude less than the magnitude of the velocity of the aircraft.

At a time $t_1$, the EWS 42 detects a signal emitted from the target T, conventionally confirms that the target T is a target that the EWS should track, and generates values for at least $\theta_{AZ\_RAW}(k)$ and $\theta_{EL\_RAW}(k)$. The EWS 42 continues to update the values for at least $\theta_{AZ\_RAW}(k)$ and $\theta_{EL\_RAW}(k)$ at each sample time k, i.e., each time that the EWS receives a signal from the target T (e.g., nominally between about 2 Hz-10 Hz).

In response to the first value for $\theta_{AZ\_RAW}(k)$, the turn determiner 56 prompts the pilot, e.g., via a display (not shown in FIGS. 10-13), to maneuver the aircraft 130 from the straight flight path 172 through a two-turn (or more-than-two-turn) flight path 174 such that a single-dimension projection 176 of this two-turn flight path is approximately perpendicular to, and approximately centered about, the target T (i.e., is approximately perpendicular to a straight line drawn from the target to the center of the single-dimension projection). Alternatively, the turn determiner 56 may automatically maneuver the aircraft 130 from the straight flight path 172 through the two-turn flight-path 174 via, e.g., a conventional auto-pilot system (not shown in FIGS. 10-13) onboard the aircraft 130.

Also in response to the first value for $\theta_{AZ\_RAW}(k)$ and the current coordinates and velocity of the aircraft 130 from the position determiner 46), the Kalman filter 164 begins to track the target T by generating $\vec{s}(k)$ and C(k) in response to at least the values of $\theta_{AZ\_RAW}(k)$ from the EWS 42 and the coordinates and velocity components of the aircraft 130 from the position determiner 46. The Kalman filter 164 may track/range the target T using a triangulation technique such as described above in conjunction with FIGS. 10-11.

Between times $t_2$ and $t_3$, the pilot maneuvers the aircraft 130 through the flight path 174 to help speed the convergence of the Kalman filter 164 to the azimuth range to the target T from the aircraft.

At two points (not shown in FIG. 13) between times $t_2$ and $t_4$, the computing apparatus 160 meets the above-described criterion for providing specified values of $H_{Range}(k)$ within two specified ranges of PRE(k) and within two specified time windows. The exact locations of the two points between times $t_2$ and $t_4$ depends on, e.g., the time lapse between $t_2$ and $t_4$ and the turn flight path 174.

The Kalman filter 164 continues operating in the above-described manner until the pilot destroys the target T, the pilot evades or flies by the target, or the pilot indicates that he/she wishes the computing apparatus to track the target no longer.

While the Kalman filter 164 is generating $\vec{s}(k)$ and C(k), the estimate generator 68 is generating values for $\theta_{AZ\_Estimated}(k)$, $\theta_{EL\_Estimated}(k)$, $H_{Range}(k)$, PRE(k), and $\theta_{Range}(k)$, and a display (not shown in FIGS. 10-13) is displaying one or more of these values to the pilot.

In an embodiment, the pilot can determine the azimuth range to the target T within approximately 99% accuracy by mentally computing the azimuth range equal to $H_{RANGE}(k)$ $\pm m \cdot \sigma_{Range}(k)$; in an embodiment m=3.

Furthermore, the Kalman filter 164 may be configured to provide sufficiently accurate values for $\vec{s}(k)$ and C(k) even if the EWS 42 introduces angle bias into $\theta_{AZ\_RAW}(k)$ and/or $\theta_{EL\_RAW}(k)$.

Still referring to FIGS. 10-13, alternate embodiments of the computing apparatus 160 are contemplated. For example, the turn determiner 56 may instruct the pilot to maneuver the aircraft 130 into the turn flight path 174 at a different relative time, such as after the Kalman filter 164 begins ranging the target T. Or, the turn determiner 56 may instruct the pilot to maneuver the aircraft 130 into a multiple turned flight path different from the flight path 174. Furthermore, although the flight path 172 is shown as heading straight for the target T in FIG. 12, the computing apparatus 160 may be configured to range the target T even if the aircraft 130 is flying along a different flight path with a different heading. Moreover, although described as flying at a constant velocity, the computing apparatus 160 may be configured to range the target T even if the aircraft 130 is not flying at a constant velocity. In addition, although shown as returning the aircraft 130 to the original flight path 172 after the turn flight path 174, the pilot may return the aircraft to another flight path. Furthermore, if the target T is moving at a velocity that is more than about one order of magnitude less than the velocity of the aircraft 130, then the Kalman filter 164 may update four variables x, y, ẋ, and ẏ, or all six variables x, y, z, ẋ, ẏ, and ż, instead of only two variables x, and y or three variables x, y, z, as described above, depending on the aircraft/target "relative geometry," azimuth-measurement accuracy, and update rate; but generally because the traversed distance the target travels on land/sea is quite small over the few minutes to several minutes during which the computer system processes the azimuth measurements, the ability to estimate well the derivative state variables may not be good, although measuring the derivative state variables may be generally unnecessary as the pilot is primarily interested in the target's position on the ground so that the he may deliver weapons to the target or simply avoid the target. Moreover, the turn flight path 174 may assist the computing apparatus 160 in acquiring and tracking more than one target.

Figure 14:
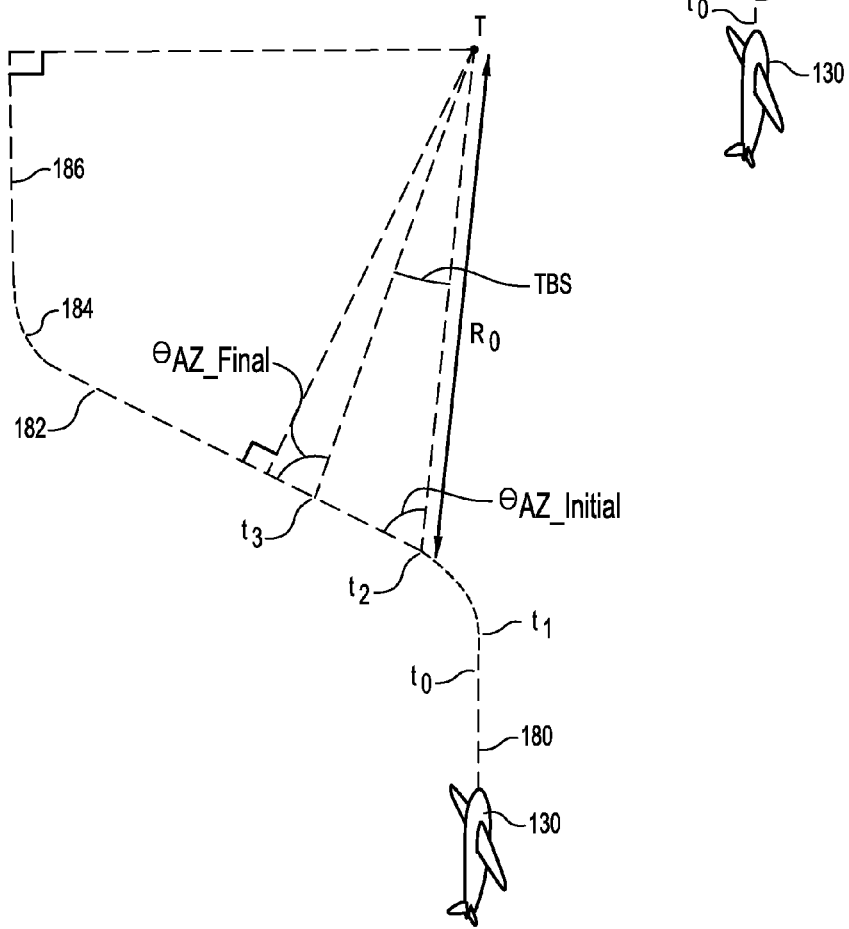
FIG. 14 is an overhead view of a tactical fighter aircraft that includes the apparatus of FIG. 12 and of a ground-based target, and demonstrates another technique that the apparatus of FIG. 12 is configured to use for ranging the target, according to an embodiment.

FIG. 14 is an overhead view of the aircraft 130 and of a ground-based target T according to another embodiment by which the computing apparatus 160 of FIG. 12 may range the target. In this embodiment, the Kalman filter 164 of FIG. 12 may be a two-state (i.e., states x and y) filter.

The operation of the computing apparatus 160 of FIG. 12 is described now in conjunction with FIGS. 10-12 and 14 according to an embodiment. In this example, the computing apparatus 160 is configured to provide a value for $H_{Range}(k)$ having a specified PRE(k) (e.g., 5%) within a specified time window (e.g., several minutes), where this time window is deemed sufficient to allow a pilot to take appropriate action regarding a detected target. It is understood that for multiple targets, the computing apparatus 160 may perform a respective instance of the below-described operation for each target.

Referring to FIG. 14, at a time $t_0$, the aircraft 130 is flying along a straight path 180 at a constant velocity and at a level altitude, and the target T is moving at a velocity having a magnitude that is no more than about one order of magnitude less than the magnitude of the velocity of the aircraft.

At a time $t_1$, the EWS 42 detects a signal emitted from the target T, and conventionally confirms that the target T is a target that the EWS should track, and generates values for at least $\theta_{AZ\_RAW}(k)$ and $\theta_{EL\_RAW}(k)$. The EWS 42 continues to update the values for at least $\theta_{AZ\_RAW}(k)$ and $\theta_{EL\_RAW}(k)$ at each sample time k, i.e., each time that the EWS receives a signal from the target T (e.g., nominally between about 2 Hz to 10 Hz).

In response to a first value for $\theta_{AZ\_RAW}(k)$, the turn determiner 56 prompts the pilot, e.g., via a display (not shown in FIG. 10-12 or 14), to maneuver the aircraft 130 from the straight flight path 180 to another straight flight path 182 such that the aircraft will traverse a bearing spread, i.e., an angle Traverse Bearing Spread (TBS), relative to the target T in a time sufficient for the computing apparatus 160 to provide a value for $H_{Range}(k)$ having the specified PRE(k) within the specified time window.

The value for TBS is, for example, a minimum value that has been deemed sufficient for the Kalman filter 164 to converge to a value for $H_{Range}(k)$ having the specified PRE(k), and is given by the following equation:

$$TBS = \theta_{AZ\_Final} - \theta_{AZ\_Initial} \quad (3)$$

where $\theta_{AZ\_Initial}$ is an arbitrary initial azimuth angle that occurs after the aircraft 130 is on the path 182, and where $\theta_{AZ\_Initial}$ and $\theta_{AZ\_Final}$ are both less than, or a both greater than, an odd multiple of 90°.

And the time TIME for the aircraft 130 to traverse the angle TBS is given by the following equation:

$$\text{TIME} = \frac{3600 \cdot \left[ R_0 \cos(\theta_{AZ\_Initial}) - \frac{R_0 \sin(\theta_{AZ\_Initial})}{\tan(\theta_{AZ\_Final})} \right]}{\text{Aircraft\_Velocity}} \quad (4)$$

where $R_0$ is the initial value of the azimuth range $H_{Range}(k)$ to the target T at the same sample time k as $\theta_{AZ\_RAW}(k) = \theta_{AZ\_Initial}$ (e.g., the EWS 42 may provide $R_0$ based on the dip-angle calculation described above in conjunction with FIGS. 12-13, or using the technique described in U.S. patent application Ser. No. 12/751,875, which was previously incorporated by reference).

Therefore, the turn determiner 56 is configured to prompt the pilot to turn the aircraft to another straight path, such as the path 182, that minimizes TIME, or that at least renders TIME short enough to allow the Kalman filter 164 to converge to a value for $H_{Range}(k)$ having the specified PRE(k) within the specified time window. In general, the sooner such a straight path makes a 90° angle with a line, in the azimuth plane, to the target T, the shorter TIME. But considerations such as the tightness of the turn (and thus the number of G's that the pilot would need to "pull"), the velocity of the aircraft 130, and the time constraints of the pilot's current mission may cause the turn determiner 56 to prompt the pilot to turn onto a straight path that does not minimize TIME, or the pilot may opt to turn onto a straight path other than the path indicated by the turn determiner. Furthermore, if the original path 180 is sufficient to meet the above objectives, then the turn determiner 56 may prompt the pilot to stay on course. Alternatively, the turn determiner 56 may automatically maneuver the aircraft 130 from the straight flight path 180 to the straight path 182 via, e.g., a conventional auto-pilot system (not shown in FIG. 10-12 or 14) onboard the aircraft 130.

Also in response to $\theta_{AZ\_RAW}(k)=\theta_{AZ\_Initial}$ and the current coordinates and velocity of the aircraft 130 from the position determiner 46, the Kalman filter 164 begins to track the target T by generating $\vec{s}(k)$ and C(k) in response to at least the values of $\theta_{AZ\_RAW}(k)$ from the EWS 42 and the coordinates and velocity components of the aircraft 130 from the position determiner 46. The Kalman filter 164 may track/range the target T using a triangulation technique such as described above in conjunction with FIGS. 10-11.

Between times $t_2$ and $t_3$, the pilot maneuvers the aircraft 130 along the flight path 182 to help speed the convergence of the Kalman filter 164 to the azimuth range to the target T from the aircraft as described above.

At approximately time $t_3$, the computing apparatus 160 meets the above-described criterion for providing a specified value of $H_{Range}(k)$ within the specified range of PRE(k) and within the specified time window.

The Kalman filter 164 continues operating in the above-described manner until the pilot destroys the target T, the pilot evades or flies by the target, or the pilot indicates that he/she wishes the computing apparatus to track the target no longer.

As the pilot maneuvers the aircraft 130 from the straight path 182, through a turn 184, and to another straight path 186, then the Kalman filter 164 may suspend tracking of the target T during the turn 184.

While the Kalman filter 164 is generating $\vec{s}(k)$ and C(k), the estimate generator 68 is generating values for $\theta_{AZ\_Estimated}(k)$, $\theta_{EL\_Estimated}(k)$, $H_{Range}(k)$, PRE(k), and $\sigma_{Range}(k)$, and a display (not shown in FIGS. 10-12 and 14) is displaying one or more of these values to the pilot.

In an embodiment, the pilot can determine the azimuth range to the target T within approximately 99% accuracy by mentally computing the azimuth range equal to $H_{RANGE}(k) \pm m \cdot \sigma_{Range}(k)$; in an embodiment m=3.

Furthermore, the Kalman filter 164 may be configured to provide sufficiently accurate values for $\vec{s}(k)$ and C(k) even if the EWS 42 introduces angle bias into $\theta_{AZ\_RAW}(k)$ and/or $\theta_{EL\_RAW}(k)$.

Still referring to FIGS. 10-12 and 14, alternate embodiments of the computing apparatus 160 are contemplated. For example, the turn determiner 56 may instruct the pilot to maneuver the aircraft 130 into the turn flight path 182 at a different relative time, such as after the Kalman filter 164 begins ranging the target T. Or, the turn determiner 56 may instruct the pilot to maneuver the aircraft 130 into a straight flight path different from the flight path 182. Furthermore, although the flight path 180 is shown as heading straight for the target T in FIG. 14, the computing apparatus 160 may be configured to range the target T even if the aircraft 130 is flying along a different initial flight path with a different heading. Moreover, although described as flying at a constant velocity, the computing apparatus 160 may be configured to range the target T even if the aircraft 130 is not flying at a constant velocity. In addition, although shown as returning the aircraft 130 to a flight path 186 that is different from the original flight path 180, the pilot may return the aircraft to the original flight path.

Referring again to FIGS. 1-14, although the entity that ranges a target has been described as a manually piloted aircraft, it is contemplated that one or more other entities, such as unmanned vehicles, may employ one or more of the above-described targeting techniques and systems. Other examples of such other entities include manned and unmanned spacecraft, manned and unmanned water craft, manned and unmanned land craft, and manned an unmanned tunneling craft.

For example, one or more branches of the Armed Services may conduct an unmanned aerial vehicle (UAV) program for surveillance, targeting, or general "situation awareness."

And one or more of the same techniques and systems described above in conjunction with FIGS. 1-14 may be applicable to a UAV platform, a major difference being that there is no pilot aboard the platform, but, instead, there are one or more remote "pilots" (e.g., on the ground) watching the flight path of the UAV and guiding the UAV to its designated region for targeting and surveillance, etc. via remote control. On such a UAV there may be one or more camera sensors and these, coupled with a passive-EW (electronic-warfare) sensing ability, may allow a UAV to perform ranging and gathering of data on surface emitters/targets (e.g., stationary and slow moving) that aid the mission commander in gathering important data. Other differences between a piloted aircraft and a UAV may include reduced angle-measurement accuracies of the sensors aboard the UAV, and the speed at which the UAV travels. Regarding the latter, some UAVs travel faster than piloted aircraft, and other UAVs may travel more slowly, e.g., at half the nominal speed of a piloted fighter aircraft. Such reduced-angle-measurement accuracy and reduced speed may result in a UAV taking a longer time to range an emitter/target, such as a surface emitter/target, because the amount of TBS (traversed-bearing-spread) is typically lower for the slower UAV platform. But the stealth aspects of such a slower UAV may allow it extra time to "loiter" in an area to gather a sufficient number of angle measurements to traverse the bearing spread, and thus to range to an emitter/target.

Furthermore, the percentage range error PRE(k) in $H_{Range}(k)$ is typically a function of the number of noisy angle measurements, the angle-measurement accuracy, and the TBS. Therefore, a technique similar to those described above for piloted aircraft may be used to speed-up the ranging convergence, such as by using any form of $\theta_{EL}(k)$ sensor aboard a UAV to determine an initial dip-angle range, which can be used to seed a 2- or 3-state Kalman filter such that the filter converges more quickly to the range (e.g., azimuth or dip-angle) of the emitter/target.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. An apparatus, comprising:
    a detector configured to determine a direction to a target in response to a signal received from the target; and
    a range finder configured to determine a range to the target in response to the direction and independently of an amplitude of the signal;
    wherein the range finder is configured to determine the range to the target by:
    tracking the target according to a first algorithm;
    tracking the target according to a second algorithm;
    weighting results of the first and second algorithms; and
    determining the range to the target in response to the weighted results of the first and second algorithms.

2. The apparatus of claim 1 wherein the direction includes an azimuth angle.

3. The apparatus of claim 1 wherein the direction includes an elevation angle.

4. The apparatus of claim 1 wherein the detector is configured to determine a direction to a moving target in response to a signal received from the moving target.

5. The apparatus of claim 1 wherein the detector is configured to determine a direction to an approximately stationary target in response to a signal received from an approximately stationary target.

6. The apparatus of claim 1 wherein the detector is configured to determine a direction to a target in response to a signal emitted from the target.

7. The apparatus of claim 1 wherein the detector includes an electronic warfare system.

8. The apparatus of claim 1 wherein
the first algorithm is configured to model a path of the target as being an approximately straight line; and
the second algorithm is configured to model the path of the target as being a curved line.

9. The apparatus of claim 1 wherein
the first algorithm is configured to model the target as moving at an approximately constant velocity; and
the second algorithm is configured to model the target as moving at a changing velocity.

10. The apparatus of claim 1 wherein the range finder includes:
a first stage configured to determine a coarse range to the target; and
a second stage configured to determine a fine range to the target in response to the coarse range.

11. The apparatus of claim 1 wherein the first algorithm is configured to model the target as not moving.

12. The apparatus of claim 1 wherein the range finder includes at least one Kalman filter.

13. The apparatus of claim 1 wherein the range finder includes at least one Kalman filter with all velocity component states having values fixed at zero.

14. The apparatus of claim 13 wherein the range finder is configured to prompt an operator of the object to move the object in a manner that increases a speed at which the range finder can determine the range.

15. An apparatus, comprising:
a detector configured to determine a direction to a target in response to a signal received from the target; and
a range finder configured to determine a range to the target in response to the direction and independently of an amplitude of the signal;
wherein the range finder includes:
a first Kalman filter configured to determine a first value of the range to the target; and
a second Kalman filter configured
to receive a seed parameter from the first Kalman filter, and
to determine a second value of the range to the target in response to the seed parameter.

16. An apparatus comprising:
a detector configured to determine a direction to a target in response to a signal received from the target; and
a range finder configured to determine a range to the target in response to the direction and independently of an amplitude of the signal;
wherein the range finder includes:
a first Kalman filter configured to determine a first value of the range to the target; and
a second Kalman filter configured
to receive seed values for filter coefficients and filter variables from the first Kalman filter, and
to determine a second value of the range to the target in response to the seed values.

17. A tangible computer readable medium storing instructions that, when executed by a computing apparatus, cause the computing apparatus to perform, or cause the computing apparatus to cause another apparatus to perform, the following steps:
determining a direction to a target in response to a signal received from the target; and
determining a range to the target in response to only the direction;
wherein the range to the target is determined by:
tracking the target according to a first algorithm;
tracking the target according to a second algorithm;
weighting results of the first and second algorithms; and
determining the range to the target in response to the weighted results of the first and second algorithms.

* * * * *